United States Patent
Jung et al.

(10) Patent No.: US 12,477,437 B2
(45) Date of Patent: Nov. 18, 2025

(54) METHOD AND APPARATUS FOR PACKET DUPLICATION IN WIRELESS COMMUNICATION SYSTEM

(71) Applicant: LG Electronics Inc., Seoul (KR)

(72) Inventors: Sunghoon Jung, Seoul (KR); Gyeongcheol Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 359 days.

(21) Appl. No.: 18/014,332

(22) PCT Filed: Aug. 2, 2021

(86) PCT No.: PCT/KR2021/010066
§ 371 (c)(1),
(2) Date: Jan. 3, 2023

(87) PCT Pub. No.: WO2022/025737
PCT Pub. Date: Feb. 3, 2022

(65) Prior Publication Data
US 2023/0199613 A1  Jun. 22, 2023

(30) Foreign Application Priority Data
Jul. 31, 2020 (KR) ........................ 10-2020-0095778

(51) Int. Cl.
*H04W 40/22* (2009.01)
*H04W 40/24* (2009.01)
(52) U.S. Cl.
CPC ......... *H04W 40/22* (2013.01); *H04W 40/248* (2013.01)

(58) Field of Classification Search
None
See application file for complete search history.

(56) References Cited

U.S. PATENT DOCUMENTS

| 2019/0082363 A1 | 3/2019 | Park et al. |
| 2019/0098640 A1 | 3/2019 | Holakouei et al. |

(Continued)

OTHER PUBLICATIONS

3GPP, "3rd Generation Partnership Project; Technical Specification Group Radio Access Network; NG-RAN; F1 application protocol (F1AP) (Release 16)," 3GPP TS 38.473 V16.2.0, Jul. 2020, 363 pages.

(Continued)

*Primary Examiner* — Brian S Roberts
(74) *Attorney, Agent, or Firm* — Fish & Richardson P.C.

(57) ABSTRACT

A method performed by a wireless device in a wireless communication system includes: receiving a configuration for a first routing identity (ID) and a second routing ID, wherein the first routing ID is related to a first routing path towards a destination node, and the second routing ID is related to a second routing path towards the destination node; receiving a first protocol data unit (PDU); based on that a condition to perform a packet duplication is satisfied, constructing a second PDU so that a header of the second PDU includes information related to the packet duplication and the second PDU includes a payload of the first PDU; transmitting, to the destination node, the first PDU via the first routing path related to the first routing ID; and transmitting, to the destination node, the second PDU including the header via the second routing path related to the second routing ID.

10 Claims, 20 Drawing Sheets

(56) References Cited

U.S. PATENT DOCUMENTS

| | | | |
|---|---|---|---|
| 2019/0098682 A1 | 3/2019 | Park et al. | |
| 2020/0336954 A1* | 10/2020 | Park | H04W 80/02 |
| 2020/0389930 A1* | 12/2020 | Park | H04W 76/15 |
| 2022/0286938 A1* | 9/2022 | Wang | H04W 76/19 |
| 2023/0247697 A1* | 8/2023 | Mildh | H04W 28/0231 370/328 |
| 2024/0163709 A1* | 5/2024 | Mildh | H04W 76/12 |

OTHER PUBLICATIONS

3GPP, "3rd Generation Partnership Project; Technical Specification Group Radio Access Network; NR; Backhaul Adaptation Protocol (BAP) specification (Release 16)," 3GPP TS 38.340 V16.0.0, Mar. 2020, 20 pages.

3GPP, "3rd Generation Partnership Project; Technical Specification Group Radio Access Network; NR; NR and NG-RAN Overall Description; Stage 2 (Release 16)," 3GPP TS 38.300 V16.1.0, Mar. 2020, 133 pages.

3GPP, "3rd Generation Partnership Project; Technical Specification Group Radio Access Network; NR; Radio Resource Control (RRC) protocol specification (Release 16)," 3GPP TS 38.331 V16.1.0, Jul. 2020, 906 pages.

\* cited by examiner

METHOD AND APPARATUS FOR PACKET DUPLICATION IN WIRELESS COMMUNICATION SYSTEM

CROSS-REFERENCE TO RELATED APPLICATIONS

This application is a National Stage application under 35 U.S.C. § 371 of International Application No. PCT/KR2021/010066, filed on Aug. 2, 2021, which claims the benefit of Korean Patent Application No. 10-2020-0095778, filed on Jul. 31, 2020. The disclosures of the prior applications are incorporated by reference in their entirety.

TECHNICAL FIELD

The present disclosure relates to a packet duplication in wireless communications.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

In IAB networks, an IAB node may receive a packet from a parent node and forward the packet to a child node. Reversely, an IAB node may also receive a packet from a child node and forward the packet to a parent node. The forwarding may be referred to as routing or packet routing along a routing path. In some cases, there may be a need to perform a packet duplication so that packets are transmitted over multiple routing paths, to enhance packet delivery robustness.

SUMMARY

An aspect of the present disclosure is to provide method and apparatus for a packet duplication in a wireless communication system.

Another aspect of the present disclosure is to provide method and apparatus for a packet duplication in IAB network in a wireless communication system.

Yet another aspect of the present disclosure is to provide method and apparatus for constructing a PDU for packet duplication in a wireless communication system.

According to an embodiment of the present disclosure, a method performed by a wireless device in a wireless communication system comprises: receiving a configuration for a first routing identity (ID) and a second routing ID, wherein the first routing ID is related to a first routing path towards a destination node, and the second routing ID is related to a second routing path towards the destination node; receiving a first protocol data unit (PDU); based on that a condition to perform a packet duplication is satisfied, constructing a second PDU so that a header of the second PDU includes information related to the packet duplication and the second PDU includes a payload of the first PDU; transmitting, to the destination node, the first PDU via the first routing path related to the first routing ID: and transmitting, to the destination node, the second PDU including the header via the second routing path related to the second routing ID.

According to an embodiment of the present disclosure, a wireless device in a wireless communication system comprises: a transceiver; a memory; and at least one processor operatively coupled to the transceiver and the memory, and configured to: control the transceiver to receive a configuration for a first routing identity (ID) and a second routing ID, wherein the first routing ID is related to a first routing path towards a destination node, and the second routing ID is related to a second routing path towards the destination node, control the transceiver to receive a first protocol data unit (PDU), based on that a condition to perform a packet duplication is satisfied, construct a second PDU so that a header of the second PDU includes information related to the packet duplication and the second PDU includes a payload of the first PDU, control the transceiver to transmit, to the destination node, the first PDU via the first routing path related to the first routing ID, and control the transceiver to transmit, to the destination node, the second PDU including the header via the second routing path related to the second routing ID.

According to an embodiment of the present disclosure, a processor for a wireless device in a wireless communication system executes instructions which are implemented by a software code stored in a memory of the wireless device. The instructions perform operations comprising: receiving a configuration for a first routing identity (ID) and a second routing ID, wherein the first routing ID is related to a first routing path towards a destination node, and the second routing ID is related to a second routing path towards the destination node; receiving a first protocol data unit (PDU); based on that a condition to perform a packet duplication is satisfied, constructing a second PDU so that a header of the second PDU includes information related to the packet duplication and the second PDU includes a payload of the first PDU; transmitting, to the destination node, the first PDU via the first routing path related to the first routing ID: and transmitting, to the destination node, the second PDU including the header via the second routing path related to the second routing ID.

According to an embodiment of the present disclosure, a non-transitory computer-readable medium has stored thereon a plurality of instructions, wherein the plurality of instructions, when executed by a processor of a wireless device, cause the wireless device to: receive a configuration for a first routing identity (ID) and a second routing ID, wherein the first routing ID is related to a first routing path towards a destination node, and the second routing ID is related to a second routing path towards the destination node, receive a first protocol data unit (PDU), based on that a condition to perform a packet duplication is satisfied, construct a second PDU so that a header of the second PDU includes information related to the packet duplication and the second PDU includes a payload of the first PDU, transmit, to the destination node, the first PDU via the first routing path related to the first routing ID, and transmit, to the destination node, the second PDU including the header via the second routing path related to the second routing ID.

The present disclosure can have various advantageous effects.

According to the present disclosure, a packet delay in IAB networks can be reduced and a packet delivery robustness in IAB networks can be achieved.

According to the present disclosure, dynamic conditional BAP duplication in TAB networks can be achieved. For example, when some problems occur at a primary routing path towards a destination node of a packet, the IAB node can perform duplication to transmit data via both the primary routing path and the secondary routing path towards the same destination node of the packet.

According to the present disclosure, the IAB node may evaluate a condition to perform a packet duplication for a specific ingress BH RLC channel for which the condition is configured, so that the IAB node can preferentially handle packets with high priority.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
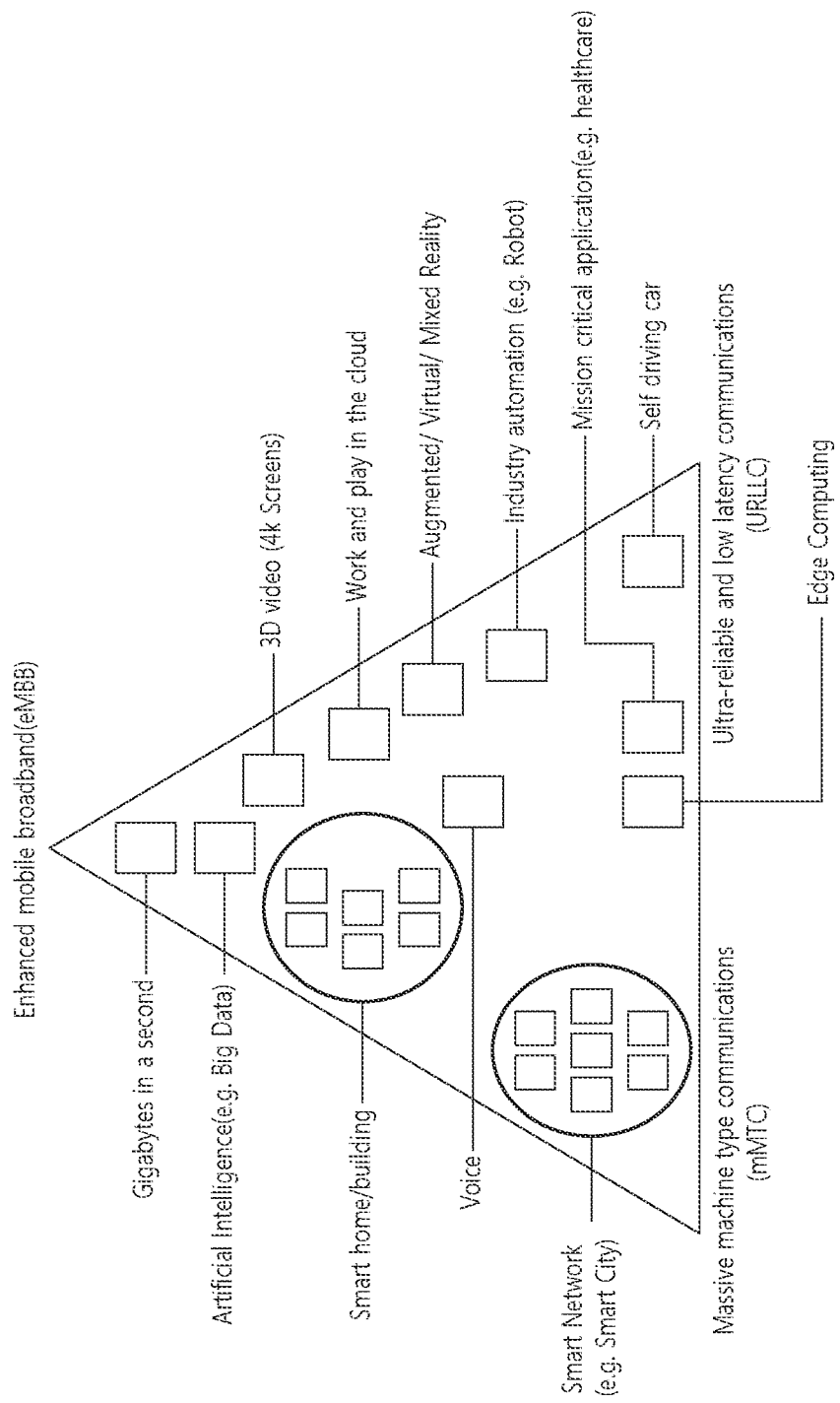
FIG. 1 shows examples of 5G usage scenarios to which the technical features of the present disclosure can be applied.

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively. OFDMA and SC-FDMA may be used for DL and/or UL.

In the present disclosure, "A or B" may mean "only A", "only B", or "both A and B". In other words, "A or B" in the present disclosure may be interpreted as "A and/or B". For example, "A. B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

The terms used throughout the disclosure can be defined as the followings:

"Integrated access and backhaul (IAB)" refers to a scheme in which a part of a wireless spectrum is used for backhaul connection of base stations instead of fiber (i.e., wireless backhaul). The IAB node may be a kind of a wireless device.

"IAB node" refers to a RAN node that supports wireless access to user equipments (UE)s and wirelessly backhauls the access traffic. The IAB node and the UE may be a kind of a wireless device.

"Backhaul (BH) radio link control (RLC) channel" refers to an RLC channel between two nodes, which is used to transport backhaul packets.

"Ingress BH RLC channel" refers to an BH RLC channel on which a packet is received by a node.

"Egress BH RLC channel" refers to an BH RLC channel on which a packet is transmitted by a node.

"Ingress link" refers to a radio link on which a packet is received by a node.

"Egress link" refers to a radio link on which a packet is transmitted by a node.

Throughout the disclosure, the terms 'radio access network (RAN) node', 'base station', 'eNB', 'gNB' and 'cell' may be used interchangeably. Further, a UE may be a kind of a wireless device, and throughout the disclosure, the terms 'UE' and 'wireless device' may be used interchangeably.

Throughout the disclosure, the terms 'cell quality', 'signal strength', 'signal quality', 'channel state', 'channel quality', 'channel state/reference signal received power (RSRP)' and 'reference signal received quality (RSRQ)' may be used interchangeably.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~ million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

NR supports multiple numerology (or, subcarrier spacing (SCS)) to support various 5G services. For example, when the SCS is 15 kHz, wide area in traditional cellular bands may be supported. When the SCS is 30 kHz/60 kHz, dense-urban, lower latency and wider carrier bandwidth may be supported. When the SCS is 60 kHz or higher, a bandwidth greater than 24.25 GHz may be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Figure 2:
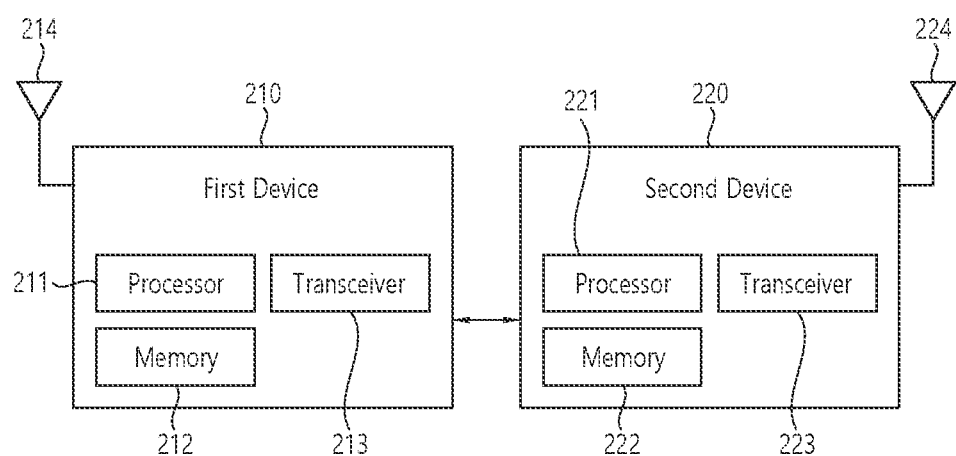
FIG. 2 shows an example of a wireless communication system to which the technical features of the present disclosure can be applied.

FIG. 2 shows an example of a wireless communication system to which the technical features of the present disclosure can be applied. Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR. VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the first device described throughout the disclosure. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled by the processor 211 to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the second device 220 described throughout the disclosure. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled by the processor 221 to transmit and receive wireless signals.

The memory 212, 222 may be connected internally or externally to the processor 211, 212, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
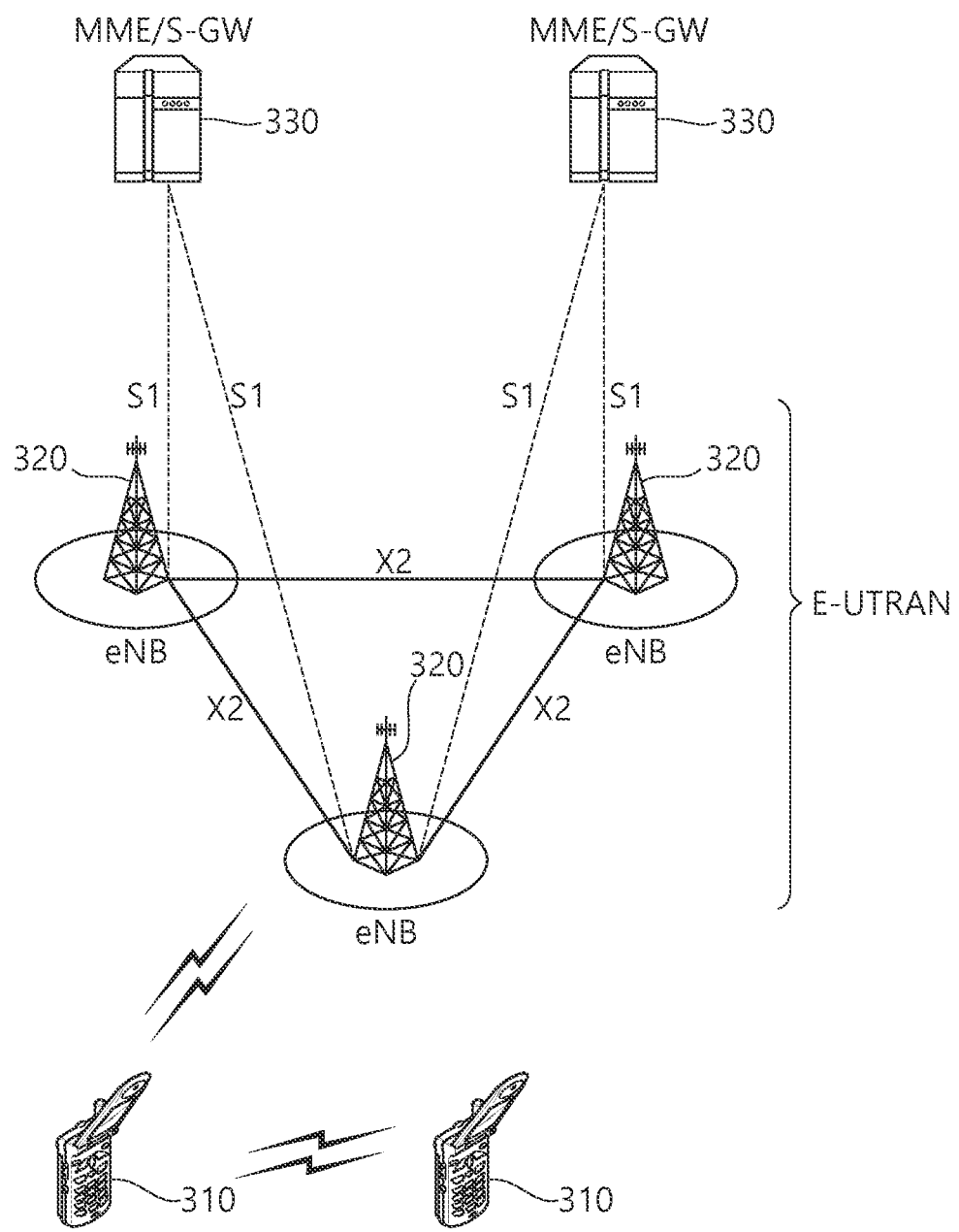
FIG. 3 shows an example of a wireless communication system to which the technical features of the present disclosure can be applied.

FIG. 3 shows an example of a wireless communication system to which the technical features of the present disclosure can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
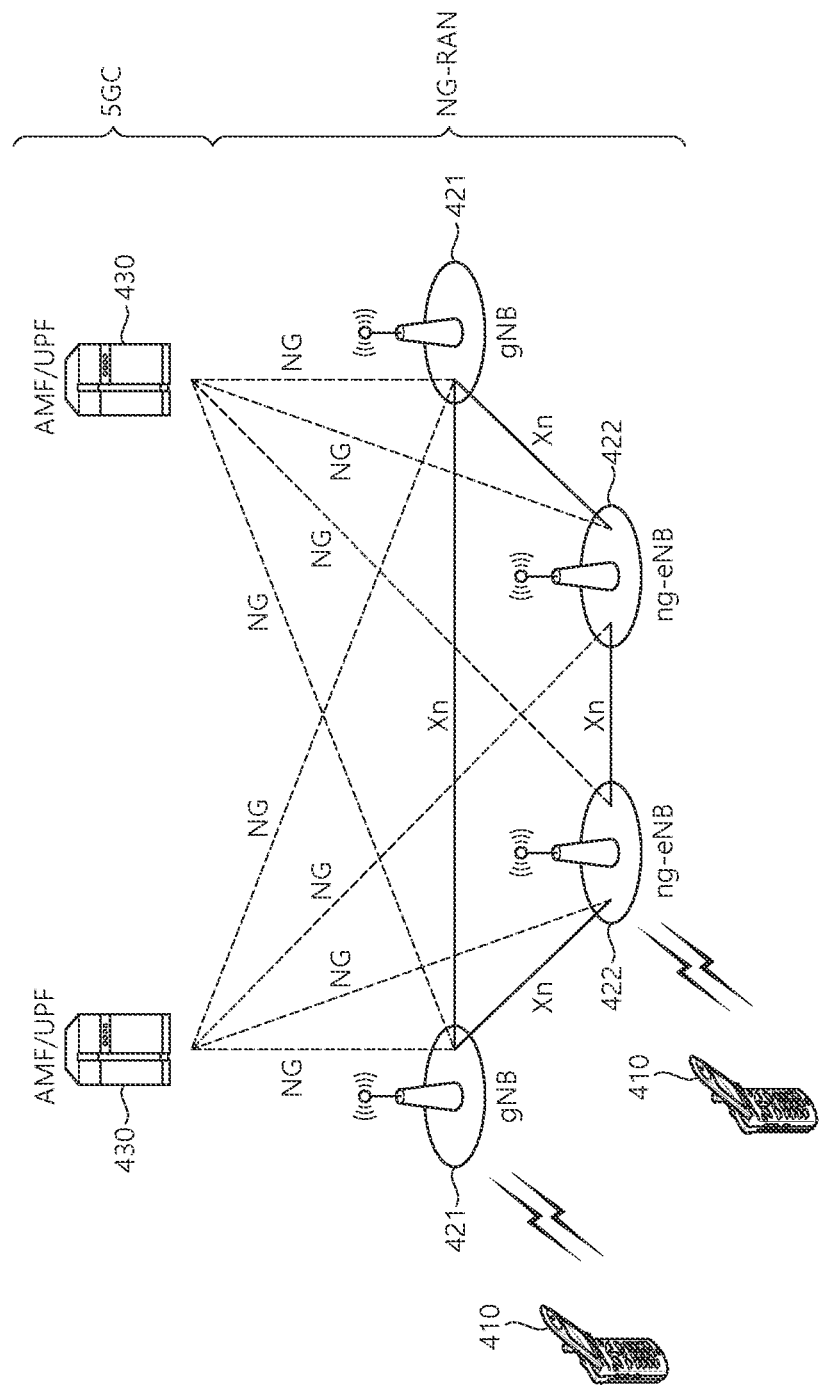
FIG. 4 shows another example of a wireless communication system to which the technical features of the present disclosure can be applied.

FIG. 4 shows another example of a wireless communication system to which the technical features of the present disclosure can be applied.

Specifically, FIG. 4 shows a system architecture based on a 5G NR. The entity used in the 5G NR (hereinafter, simply referred to as "NR") may absorb some or all of the functions of the entities introduced in FIG. 3 (e.g. eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
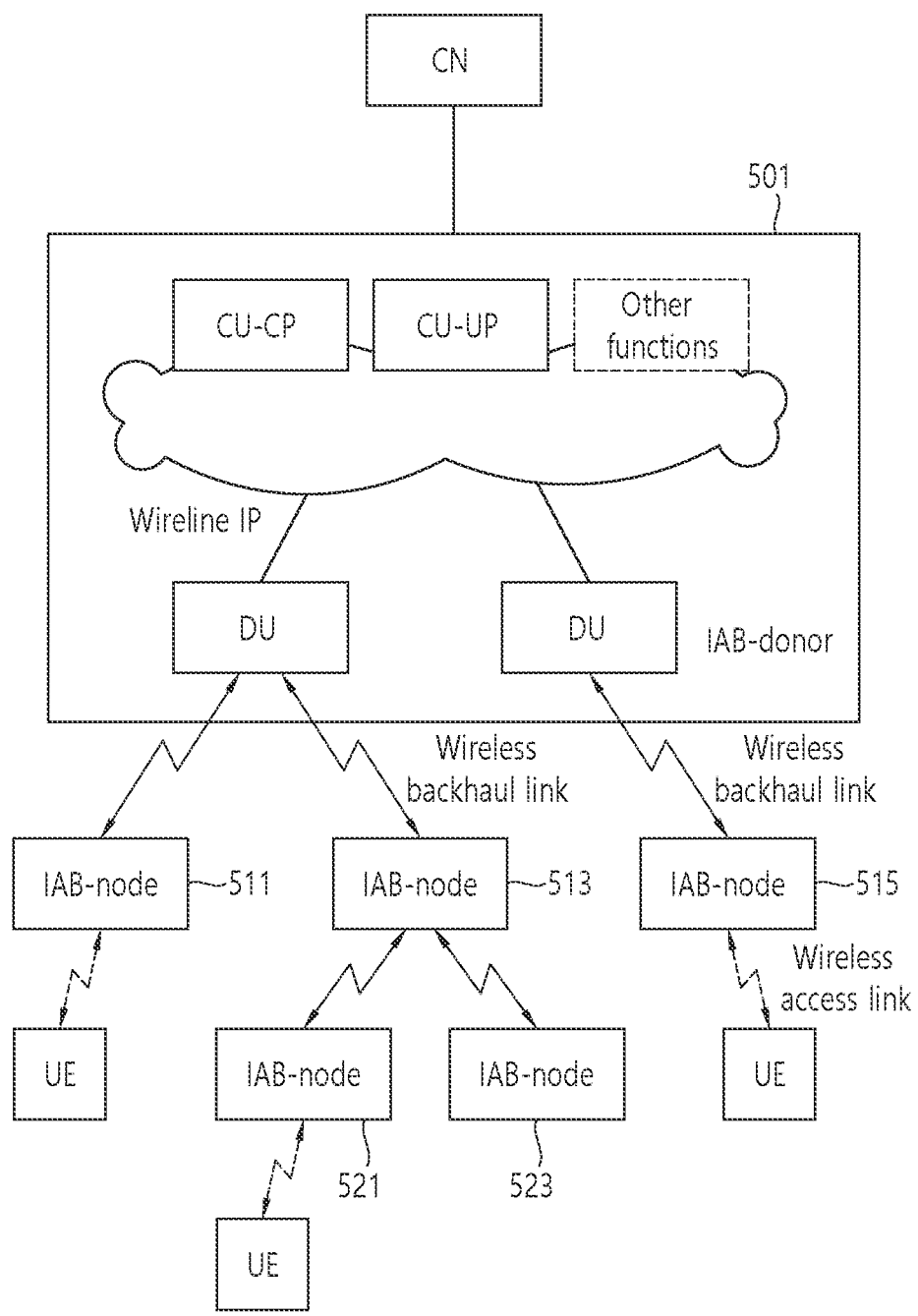
FIG. 5 shows an example of IAB topology to which technical features of the present disclosure can be applied.

FIG. 5 shows an example of IAB topology to which technical features of the present disclosure can be applied.

Referring to FIG. 5, the IAB topology may comprise an IAB donor 501 and multiple IAB nodes 511, 513, 515, 521 and 523. "IAB donor node (or, simply IAB donor)" refers to a RAN node which provides UE's interface to core network (CN) and wireless backhauling functionalities to IAB nodes. The IAB donor 501 may be treated as a signal logical node that may comprise a set of functions such as DU, CU-CP, CU-UP and potentially other functions. In a deployment, the IAB donor can be split according to these functions, which can all be either collocated or non-collocated. Also, some of the functions presently associated with the IAB donor may eventually be moved outside of the IAB donor in case it becomes evident that the functions do not perform IAB-specific tasks.

The IAB donor 501 may be connected to the IAB node 511, 513 and 515 via wireless backhaul link (hereinafter, the terms "wireless backhaul link" and "wireless backhaul channel" can be used interchangeably), and may communicate with the IAB node 511, 513 and/or 515 via the wireless backhaul link. For example, DUs of the IAB donor 501 may be used to communicate with the IAB nodes 511, 513 and/or 515 via wireless backhaul link. Each of the IAB node 511 and 515 may communicate with a UE served by itself via wireless access link (hereinafter, the term "wireless access link and wireless access channel can be used interchangeably). Further, the IAB donor 501 may be a parent node for the IAB node 511, 513 and 515, and the IAB node 511, 513 and 515 may be a child node for the IAB donor 501. The definition of the parent node and the child node will be described later.

The IAB node 513 may be connected to IAB node 521 and 523 via wireless backhaul link, and may communicate with the IAB node 521 and/or 523 via wireless backhaul link. The IAB node 521 may communicate with a UE served by itself via wireless access link. Further, the IAB node 513 may be a parent node for the IAB node 521 and 523, and the IAB node 521 and 523 may be a child node for the IAB node 513.

The IAB nodes 511, 513 and 515 may directly communicate with IAB donor 501 via wireless backhaul link. Therefore, the distance between the IAB donor 501 and each of the IAB nodes 511, 513 and 515 may be expressed as 1-hop distance. The IAB donor 501 may be 1-hop parent node for the IAB nodes 511, 513 and 515, and the IAB nodes 511, 513 and 515 may be 1-hop child node for the IAB donor 501.

The IAB nodes 521 and 523 may communicate with the IAB donor 501 via a first wireless backhaul link and a second wireless backhaul link. The first wireless backhaul link may be a wireless backhaul link between i) the IAB node 513 ii) the IAB nodes 521 and/or 523. The second wireless backhaul link may be a wireless backhaul link between the IAB node 513 and the IAB donor 501. Therefore, the distance between the IAB donor 501 and each of the IAB nodes 521 and 523 may be expressed as 2-hop distance. The IAB donor 501 may be 2-hop parent node for the IAB nodes 521 and 523, and the IAB nodes 521 and 523 may be 2-hop child node for the IAB donor 501. In a similar way, N-hop distance may be defined between arbitrary IAB nodes (including or not including IAB donor), and thus. N-hop parent node and N-hop child node may also be defined.

Figure 6:
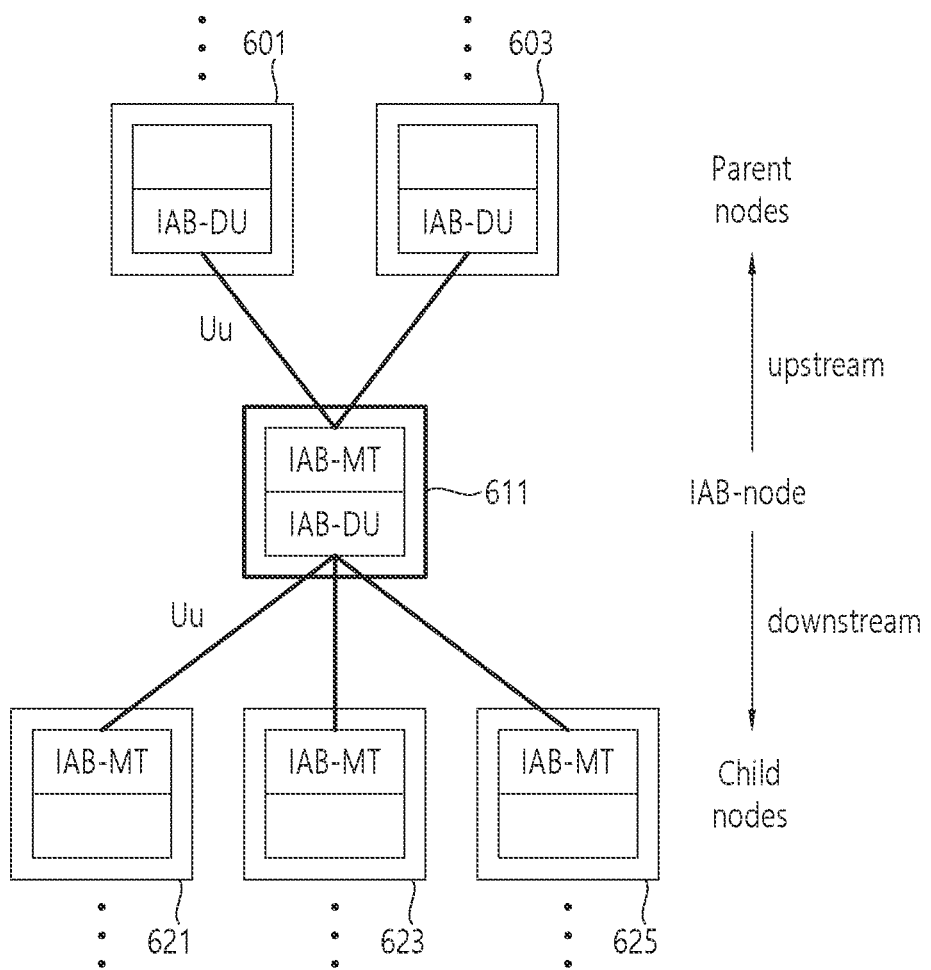
FIG. 6 shows a parent and child node relationship for IAB node to which technical features of the present disclosure can be applied.

FIG. 6 shows a parent and child node relationship for IAB node to which technical features of the present disclosure can be applied.

Referring to FIG. 6, an IAB node 611 may be connected to parent nodes 601 and 603 via wireless backhaul links, and may be connected to child nodes 621, 623 and 625 via wireless backhaul links. Throughout the disclosure, "parent IAB node (or, simply parent node)" for an IAB node may be defined as a next hop neighbor node with respect to an IAB-mobile termination (IAB-MT, or simply MT) of the IAB node. That is, the neighbor node on the IAB-MTs interface may be referred to as a parent node. The parent node can be IAB node or IAB donor-DU. Further, "child IAB node (or, simply child node)" for an IAB node may be defined as a next hop neighbor node with respect to an IAB-DU (or, simply DU) of the IAB node. That is, the neighbor node on the IAB-DU's interface may be referred to as a child node.

IAB-MT may refer to an IAB node function that terminates the Uu interface to the parent node. IAB-DU may refer to a gNB-DU functionality supported by the IAB node to terminate the access interface to UEs and next-hop IAB nodes, and/or to terminate the F1 protocol to the gNB-CU functionality on the IAB donor.

The direction toward the child node may be referred to as downstream while the direction toward the parent node may be referred to as upstream. Further, a backhaul link between an IAB node and a parent node for the IAB node may be referred to as upward backhaul link for the IAB node. A backhaul link between an IAB node and a child node for the IAB node may be referred to as downward backhaul link for the IAB node. A backhaul link for an IAB node may comprise at least one of an upward backhaul link for the IAB node, or a downward backhaul link for the IAB node.

The IAB-node may have redundant routes to the IAB-donor CU.

For IAB-nodes operating in SA-mode, NR dual connectivity (DC) may be used to enable route redundancy in the backhaul (BH) by allowing the IAB-MT to have concurrent BH RLC links with two parent nodes. The parent nodes have to be connected to the same IAB-donor CU-CP, which controls the establishment and release of redundant routes via these two parent nodes. The parent nodes together with the IAB-donor CU may obtain the roles of the IAB-MT's master node and secondary node. The NR DC framework (e.g. MCG/SCG-related procedures) may be used to configure the dual radio links with the parent nodes.

Figure 7:
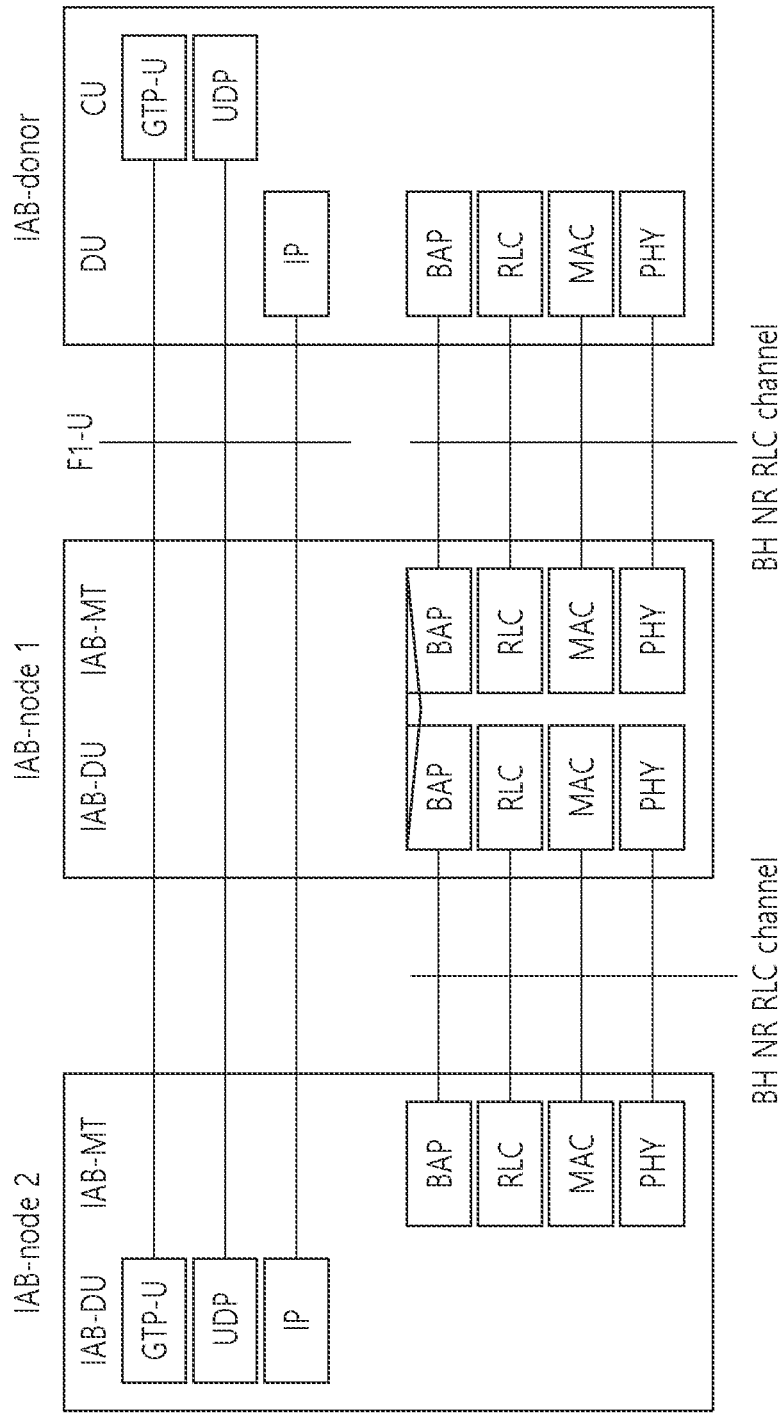
FIG. 7 shows an example of a protocol stack for F1-U protocol between IAB-DU and IAB donor-CU to which technical features of the present disclosure can be applied.
Figure 8:
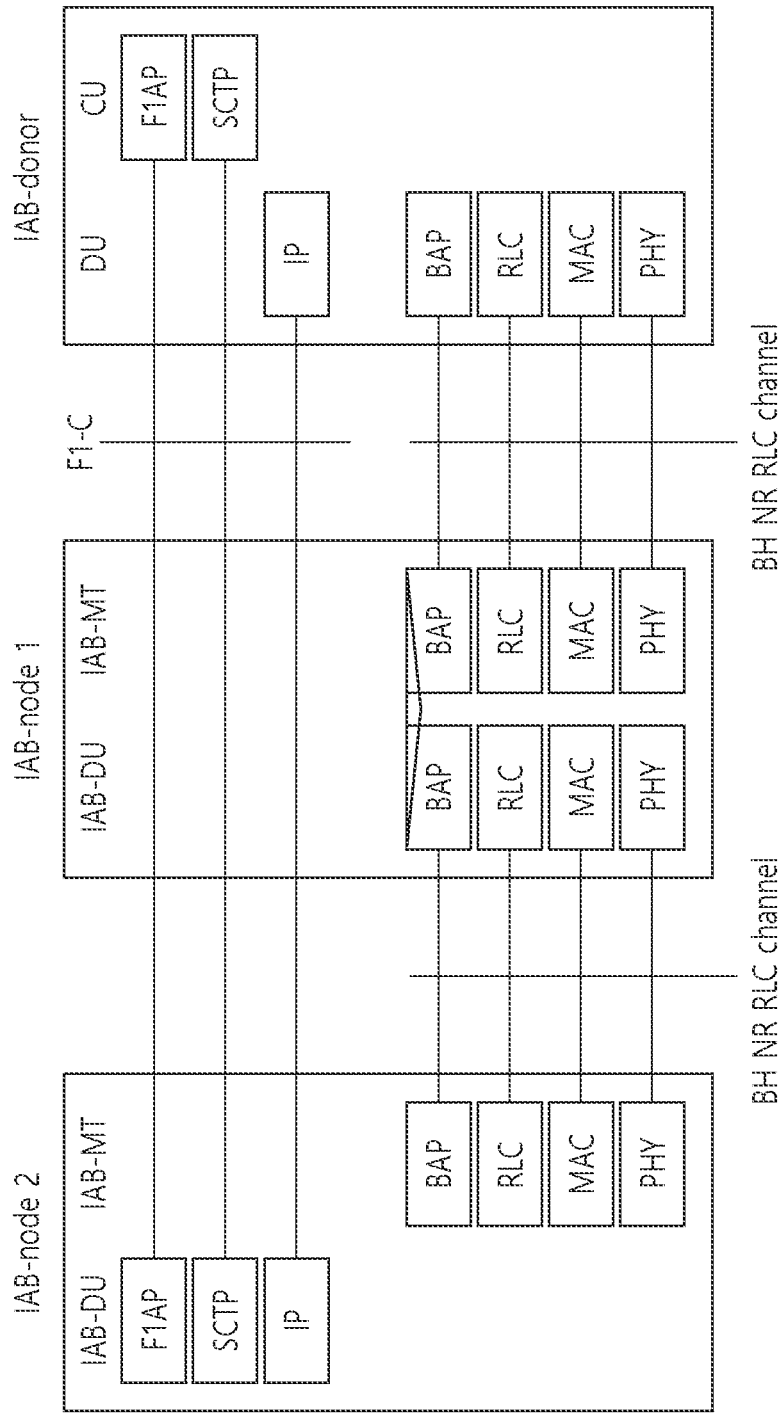
FIG. 8 shows an example of a protocol stack for F1-C protocol between IAB-DU and IAB donor-CU to which technical features of the present disclosure can be applied.

FIG. 7 shows an example of a protocol stack for F1-U protocol between IAB-DU and IAB donor-CU to which technical features of the present disclosure can be applied. FIG. 8 shows an example of a protocol stack for F1-C protocol between IAB-DU and IAB donor-CU to which technical features of the present disclosure can be applied. In FIGS. 7-8, it is exemplary assumed that F1-U and F1-C are carried over 2 backhaul hops.

Referring to FIGS. 7 to 8, on the wireless backhaul, the IP layer may be carried over a backhaul adaptation protocol (BAP) sublayer, which enables routing over multiple hops. The IP layer may be also used for some non-F1 traffic, such as signalling traffic for the establishment and management of SCTP associations and the F1-supporting security layer.

On each backhaul link, the BAP PDUs may be carried by backhaul (BH) radio link control (RLC) channels. Multiple BH RLC channels can be configured on each BH link to allow traffic prioritization and QoS enforcement. The BH-RLC-channel mapping for BAP PDUs may be performed by the BAP entity on each IAB-node and the IAB-donor.

Figure 9:
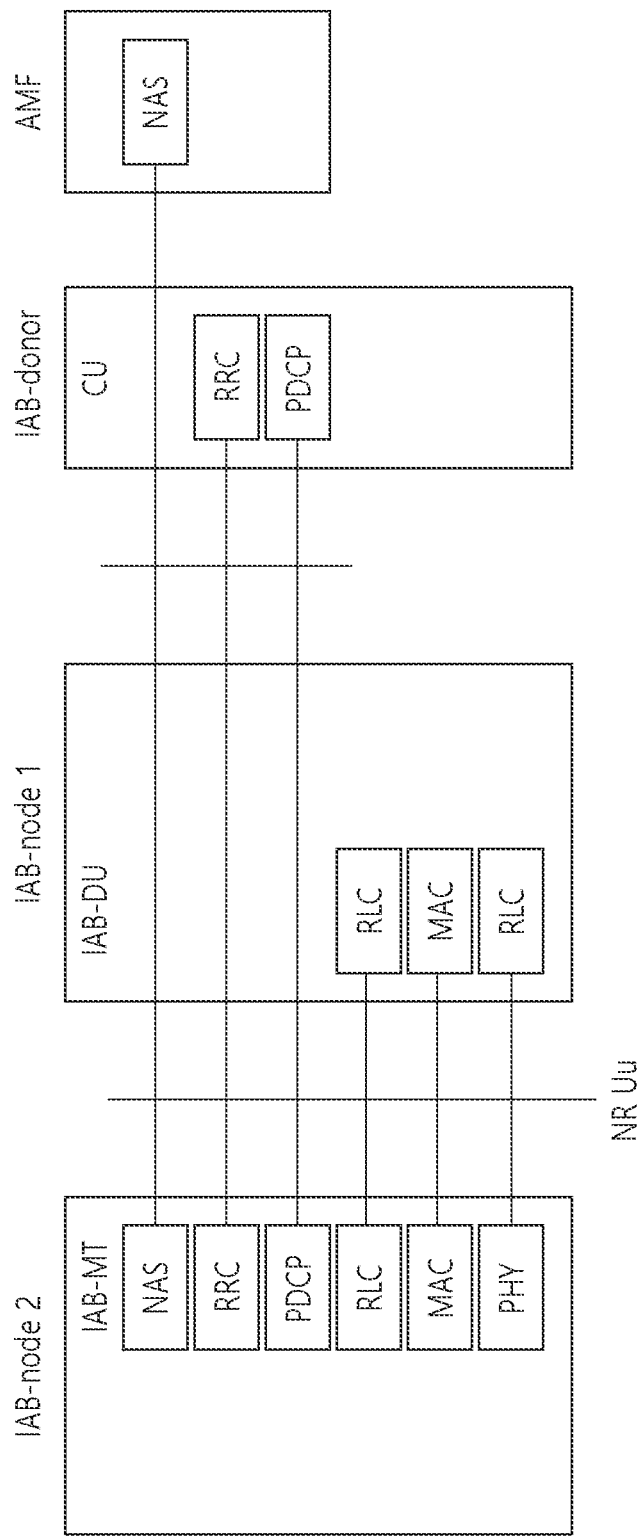
FIG. 9 shows an example of a protocol stack for IAB-MTs RRC and NAS connections.

FIG. 9 shows an example of a protocol stack for IAB-MT's RRC and NAS connections.

Referring to FIG. 9, protocol stacks for SRB and/or DRB are shown. The IAB-MT may establish SRBs carrying RRC and NAS and potentially DRBs (e.g. carrying OAM traffic) with the IAB-donor. These SRBs and DRBs may be transported between the IAB-MT of an IAB node and a parent node for the IAB node over Uu access channel(s).

In FIGS. 7 to 9, each of the IAB donor, IAB node 1 and IAB node 2 may comprise a physical (PHY) layer, a media access control (MAC) layer, a radio link control (RLC) layer, a packet data convergence protocol (PDCP) layer, a radio resource control (RRC) layer and/or a non-access stratum (NAS) layer.

The PHY layer may belong to layer 1 (L1). The PHY layer offers information transfer services to MAC sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer may belong to layer 2 (L2). The main services and functions of the MAC sublayer include mapping between logical channels and transport channels, multiplexing/de-multiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE. DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

Further, each of the IAB donor, IAB node 1 and IAB node 2 may comprise a BAP layer/sublayer. The main service and functions of the BAP sublayer may include:
Transfer of data;
Routing of packets to next hop;
Determination of BAP destination and path for packets from upper layers;
Determination of egress RLC channels for packets routed to next hop;
Differentiating traffic to be delivered to upper layers from traffic to be delivered to egress link;
Flow control feedback signalling; and/or
BH RLF notification.

The IAB-DU's IP traffic may be routed over the wireless backhaul via the BAP sublayer. In downstream direction, IP packets may be encapsulated by the BAP sublayer at the IAB-donor, and de-encapsulated at the destination IAB-node. In upstream direction, the upper layer traffic may be encapsulated at the IAB-node, and de-encapsulated at the IAB-donor.

On the BAP sublayer, packets may be routed based on the BAP routing ID, which is carried in the BAP header. The BAP header may be added to the packet when the packet arrives from upper layers, and the packet may be stripped off when the packet has reached a destination node of the packet. The selection of the packet's BAP routing ID may be configured by the IAB-donor. The BAP routing ID may comprise/consists of BAP address and BAP path ID. The BAP address may indicate the destination node of the packet on the BAP sublayer, and the BAP path ID may indicate the routing path the packet should follow to the destination. For the purpose of routing, each IAB-node may be further configured with a designated BAP address.

On each hop of the packet's path, the IAB-node may inspect the packet's BAP address in the routing header to determine if the packet has reached its destination, i.e., matches the IAB-node's BAP address. In case the packet has not reached the destination, the IAB-node may determine the next hop backhaul link, referred to as egress link, based on the BAP routing ID carried in the packet header and a routing configuration the IAB-node received from the IAB-donor.

The IAB-node may also select the BH RLC channel on the designated egress link. For packets arriving from upper layers, the selection of the BH RLC channel may be configured by the CU, and it is based on upper layer traffic specifiers. Since each BH RLC channel is configured with a QoS code point or priority level, RLC-channel selection may facilitate traffic-specific prioritization and QoS enforcement on the BH. For F1-U traffic, it may be possible to map each GTP-U tunnel to a dedicated BH RLC channel or to aggregate multiple GTP-U tunnels into one common BH RLC channel.

When packets are routed from one BH link to another, the BH RLC channel on the egress BH link may be determined based on the mapping configuration between ingress BH RLC channels and egress BH RLC channels provided by the IAB-donor.

In upstream direction, the IAB-donor CU may configure the IAB-node with mappings between upstream F1- and non-F1-traffic originated at the IAB-node, and the appropriate BAP routing ID and Backhaul RLC channel. A specific mapping may be configured:

for each F1-U GTP-U tunnel;
for non-UE associated F1AP messages;
for UE-associated F1AP messages of each UE; and/or
for non-F1 traffic.

Multiple mappings can contain the same Backhaul RLC channel and/or BAP routing ID.

These configurations may be received via F1AP. During IAB-node integration, before F1AP is established, a default BH RLC channel and a default BAP routing ID may be configured via RRC, which are used for all upper layer traffic.

In downstream direction, traffic mapping may occur internal to the IAB-donor.

Figure 10:
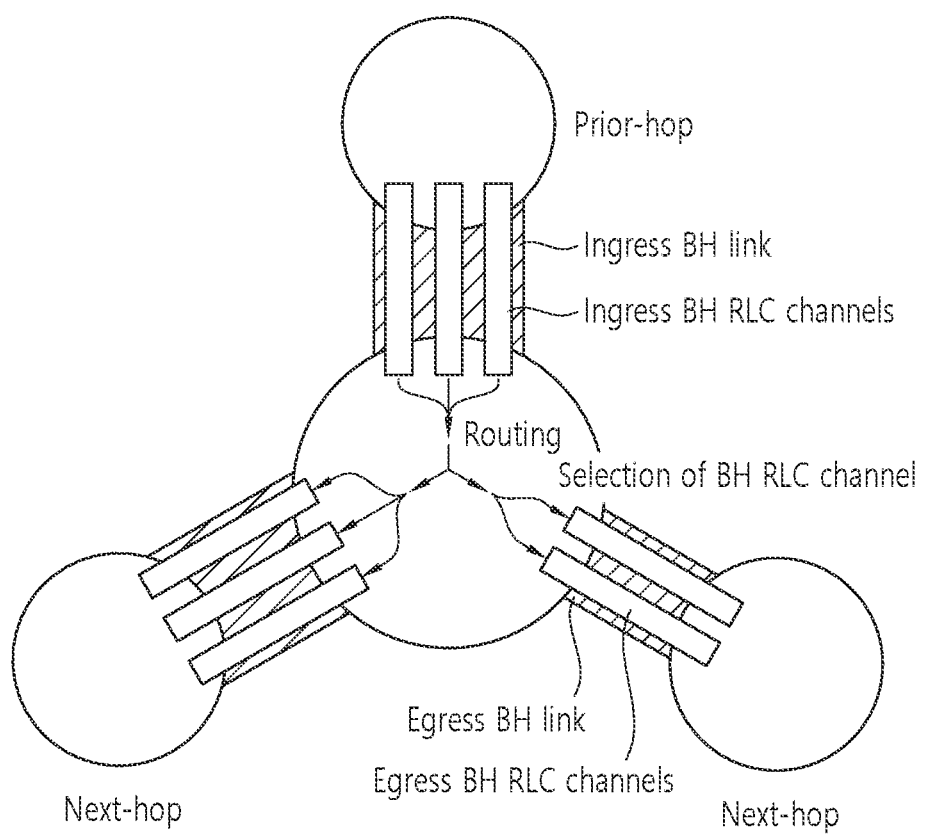
FIG. 10 shows an example of routing and BH RLC channel selection on BAP sublayer to which technical features of the present disclosure can be applied.

FIG. 10 shows an example of routing and BH RLC channel selection on BAP sublayer to which technical features of the present disclosure can be applied.

Routing on BAP sublayer may use the BAP routing ID, which is configured by the IAB-donor. For the routing ID, the flow control information may be provided in the flow control feedback. The BAP routing ID may comprise/consist of BAP address and BAP path ID. A length of the routing ID may be 20 bits, in which leftmost 10 bits may indicate BAP address and rightmost 10 bits may indicate BAP path ID. The BAP address may be used for the following purposes:

1. Determination if a packet has reached the destination node, i.e. IAB-node or IAB-donor DU, on BAP sublayer. This may be the case if the BAP address in the packet's BAP header matches the BAP address configured via RRC on the IAB-node, or via F1AP on the IAB-donor DU.

2. Determination of the next-hop node for packets that have not reached their destination. This may apply to packets arriving from a prior hop on BAP sub-layer or that have been received from IP layer.

For packets arriving from a prior hop, the determination of the next-hop node may be based on a routing configuration provided by the IAB-donor CU via F1AP signalling. The routing configuration may contain the mapping between the BAP routing ID carried in the packet's BAP header and the next-hop node's BAP address, as specified in table 3:

TABLE 3

| BAP routing ID | Next-hop BAP address |
| --- | --- |
| Derived from BAP packet's BAP header | To be used to forward packet |

The IAB-node may resolve the next-hop BAP address to a physical backhaul link. For this purpose, IAB-donor CU may provide IAB-node with its child-node's BAP address in a UE-associated F1AP message and its parent-node's BAP address in RRC signalling. The IAB-node can receive multiple routing configurations with the same destination BAP address but different BAP path IDs. These routing configurations may resolve to the same or different egress BH links. In case the BH link has RLF, the IAB-node may select another BH link based on routing entries with the same destination BAP address, i.e., by disregarding the BAP path ID. In this manner, a packet can be delivered via an alternative path in case the indicated path is not available.

When routing a packet from an ingress to an egress BH link, the IAB-node may derive the egress RLC-channel on the egress BH link through an F1AP-configured mapping from the RLC channel used on the ingress BH link. The RLC channel IDs used for ingress and egress BH RLC channels may be generated by the IAB-donor CU. Since the RLC channel ID only has link-local scope, the mapping configurations may also include the BAP addresses of prior and next hop, as specified in table 4:

TABLE 4

| Next-hop BAP address | Prior-hop BAP address | Ingress RLC channel ID | Egress RLC channel ID |
| --- | --- | --- | --- |
| Derived from routing configuration | Derived from packet's ingress link | Derived from packet's ingress link | To be used on egress link to forward packet |

Figure 11:
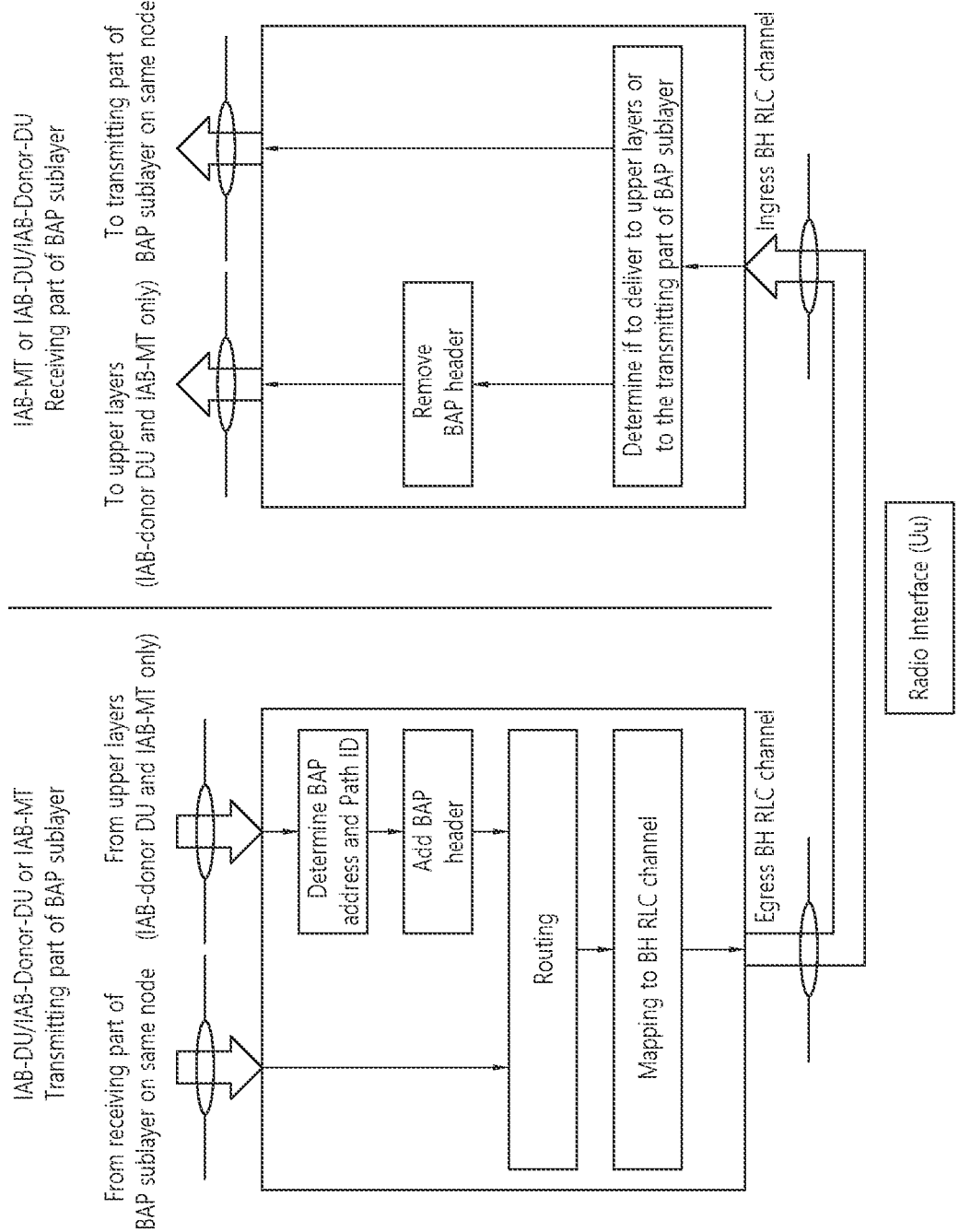
FIG. 11 shows an example of a functional view of BAP sublayer to which technical features of the present disclosure can be applied.

The IAB-node may resolve the BH RLC channel IDs from logical channel IDs based on the configuration by the IAB-donor. For RLC channels in downstream direction, the RLC channel ID may be included in the F1AP configuration of the RLC channel. For RLC channels in upstream direction, the RLC channel ID may be included in the RRC configuration of the corresponding logical channel. FIG. 11 shows an example of a functional view of BAP sublayer to which technical features of the present disclosure can be applied.

On the IAB-node, the BAP sublayer may contain one BAP entity at the MT function and a separate BAP entity at the DU function. On the IAB-donor DU, the BAP sublayer may contain only one BAP entity. Each BAP entity may have a transmitting part and a receiving part. The transmit part of the BAP entity may have a corresponding receiving part of a BAP entity at the IAB node or IAB donor DU across the backhaul link.

The receiving part on the BAP entity may deliver BAP PDUs to the collocated transmitting part on the BAP entity. Alternatively, the receiving part may deliver BAP SDUs to the collocated transmitting part. When passing BAP SDUs, the receiving part may remove the BAP header and the transmitting part may add the BAP header with the same BAP routing ID as carried on the BAP PDU header prior to removal. Passing BAP SDUs in this manner may be therefore functionally equivalent to passing BAP PDUs, in implementation.

The transmitting part of the BAP entity on the IAB-MT can receive BAP SDUs from upper layers and BAP Data Units from the receiving part of the BAP entity on the IAB-DU of the same IAB-node, and construct BAP Data PDUs as needed. The transmitting part of the BAP entity on the IAB-DU can receive BAP Data Units from the receiving part of the BAP entity on the IAB-MT of the same IAB node and construct BAP Data PDUs as needed. The transmitting part of the BAP entity on the IAB-donor DU can receive BAP SDUs from upper layers.

Upon receiving a BAP SDU from upper layers, the transmitting part of the BAP entity shall:
    select a BAP address and a BAP path identity for this BAP SDU;
    construct a BAP Data PDU by adding a BAP header to the BAP SDU, where the DESTINATION field is set to the selected BAP address and the PATH field is set to the selected BAP path identity.

When the BAP entity has a BAP Data PDU to transmit, the transmitting part of the BAP entity shall:
    perform routing to determine the egress link:
    determine the egress BH RLC channel:
    submit this BAP Data PDU to the selected egress BH RLC channel of the selected egress link.

Data buffering on the transmitting part of the BAP entity, e.g., until RLC-AM entity has received an acknowledgement, may be performed. In case of BH RLF, the transmitting part of BAP entity may reroute the BAP Data PDUs, which has not been acknowledged by lower layer before the backhaul RLF, to an alternative path.

Upon receiving a BAP Data PDU from lower layer (i.e. ingress BH RLC channel), the receiving part of the BAP entity shall:

1> if DESTINATION field of this BAP PDU matches the BAP address of this node:
2> remove the BAP header of this BAP PDU and deliver the BAP SDU to upper layers.
1> else:
2> deliver the BAP Data Unit to the transmitting part of the collocated BAP entity.

When a BAP PDU that contains reserved or invalid values or contains a BAP address which is not included in the configured BH routing information received, the BAP entity shall discard the received BAP PDU.

In IAB networks, a certain backhaul link may experience transmission problem due to e.g., degradation of backhaul link quality or improper load balancing across the IAB nodes. Degradation of backhaul link quality may happen frequently if the backhaul link experienced non-line of sight channel between two neighbour nodes due to blockages or if the beam-alignment between two neighbour nodes are not properly managed. Improper load balancing may occur due to unexpected surge of traffic arrival in a specific node or unexpected degradation of backhaul link quality.

A local backhaul link problem can quickly propagate over the neighbour nodes due to the nature of the multi-hop transmissions unless proper control to tackle such backhaul link problem is introduced. To ensure QoS over multi-hop wireless transmission in IAB networks and to control redundancy, it is important to exploit path diversity, if available, such that packets on a path with a problem can be concurrently transmitted over multiple paths only when necessary.

Figure 12A:
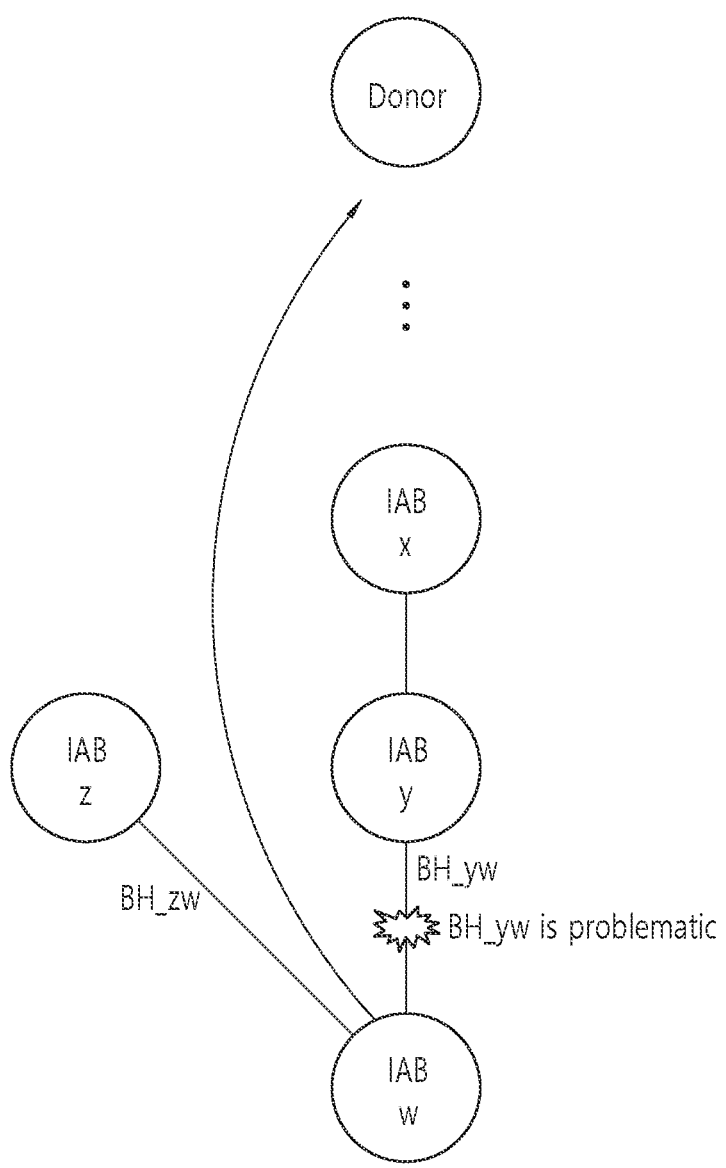
FIGS. 12A and 12B show an example of backhaul link problem to which technical features of the present disclosure can be applied.
Figure 12B:
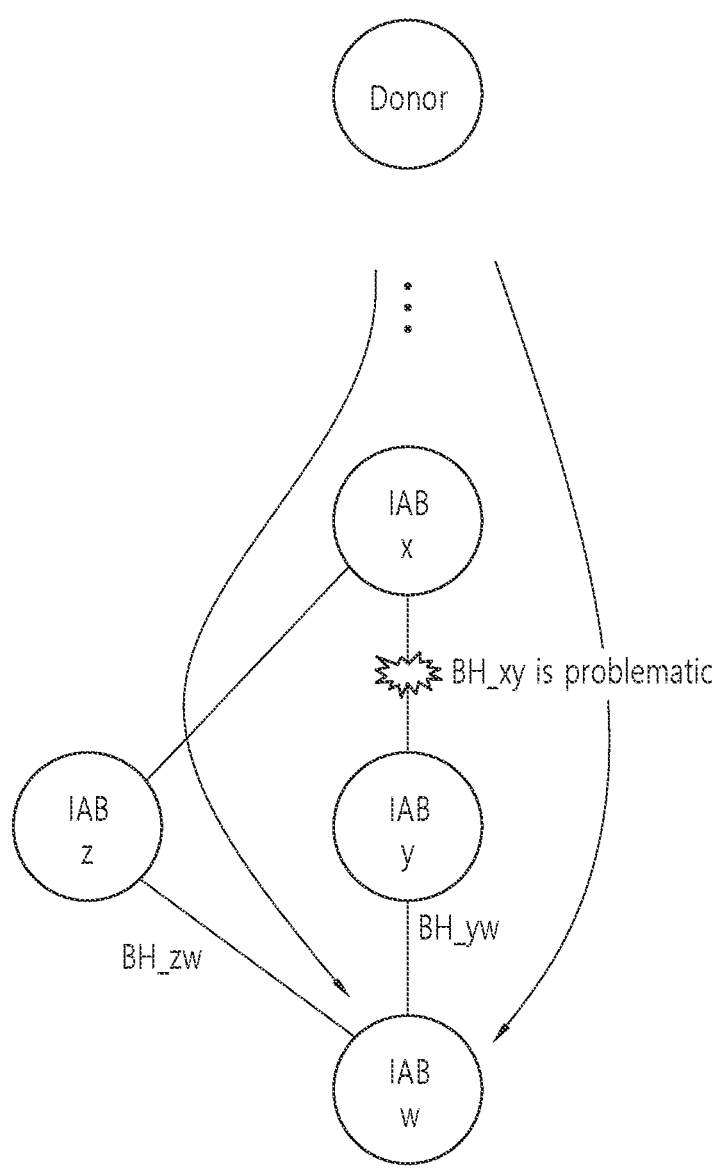

FIGS. 12A and 12B show an example of backhaul link problem to which technical features of the present disclosure can be applied.

Referring to FIG. 12A, a backhaul link problem may occur at a backhaul link BH_vw between IAB node "y" and IAB node "w". Therefore, upstream transmission from IAB node "w" towards IAB donor node via the BH_yw may not be possible. Referring to FIG. 12B, a backhaul link problem may occur at a backhaul link BH_xy between IAB node "x" and IAB node "y". Therefore, downstream transmission from IAB donor node towards IAB node "w" via the BH_xy may not be possible. However, there is another path towards IAB node "w", by using a backhaul link BH_xz between IAB node "x" and IAB node "z", and a backhaul link BH_zw between TAB node "z" and IAB node "w". By using a path including the BH_xz and the BH_zw, downstream transmission from IAB donor node towards IAB node "w" may be possible.

In an IAB network topology, there may be one or more paths from a source IAB node to a destination IAB node. From a single IAB node perspective, an IAB node may have one or multiple next hops for the same destination node. For example, the IAB node may have a primary routing path and a secondary routing path for the same destination node. In some cases, there may be a need for the IAB node to duplicate packets and transmit the original packets and the duplicated packets via the primary routing path and the secondary routing path towards the same destination node, respectively.

Figure 13:
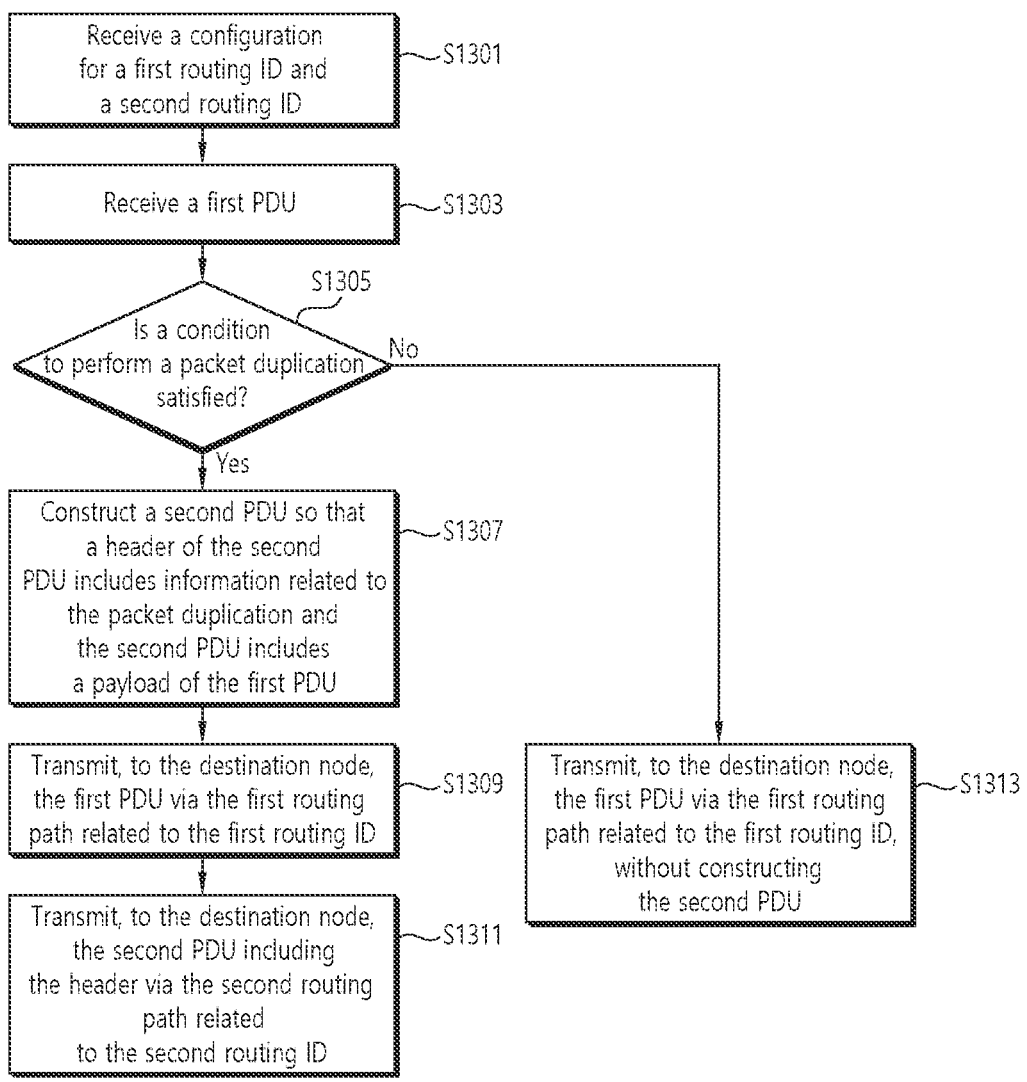
FIG. 13 shows an example of a method for transmitting duplicated packets on multiple routing paths according to an embodiment of the present disclosure.

FIG. 13 shows an example of a method for transmitting duplicated packets on multiple routing paths according to an embodiment of the present disclosure. Steps illustrated in FIG. 13 may be performed by a wireless device and/or an IAB node.

Referring to FIG. 13, in step S1301, the wireless device may receive a configuration for a first routing ID and a second routing ID. The first routing ID may be related to a first routing path towards a destination node, and the second routing ID may be related to a second routing path towards the destination node.

In step S1303, the wireless device may receive a first PDU. The first PDU may be received from a parent node for the wireless device, or a child node for the wireless device.

In step S1305, the wireless device may determine whether a condition to perform a packet duplication is satisfied. That is, the wireless device may evaluate the condition to determine whether the condition is satisfied or not.

If the condition to perform the packet duplication is satisfied, in step S1307, the wireless device may construct a second PDU so that a header of the second PDU includes information related to the packet duplication and the second PDU includes a payload of the first PDU.

In step S1309, the wireless device may transmit, to the destination node, the first PDU via the first routing path related to the first routing ID.

In step S1311, the wireless device may transmit, to the destination node, the second PDU including the header via the second routing path related to the second routing ID.

Steps S1309 and S1311 may be performed in an order, in a reverse order, or simultaneously.

If the condition to perform the packet duplication is not satisfied, in step S1313, the wireless device may transmit, to the destination node, the first PDU via the first routing path related to the first routing ID, without constructing the second PDU.

According to various embodiments, the first routing ID may comprise a destination ID for the destination node and a first path ID related to the first routing path. The second routing ID comprise the destination ID for the destination node and a second path ID related to the second routing path.

According to various embodiments, the first routing ID may be a main routing ID. The second routing ID may be an auxiliary routing ID for the main routing ID.

According to various embodiments, the information related to the packet duplication may comprise a duplication flag. The duplication flag may inform that a PDU of which header comprises the duplication flag is a duplicated PDU. The duplication flag may be used so that a next hop of the wireless device having received the second PDU forwards the second PDU without discarding the second PDU.

According to various embodiments, the information related to the packet duplication may comprise the second routing ID.

According to various embodiments, the information related to the packet duplication may comprise a destination ID for the destination node.

According to various embodiments, a header of the first PDU transmitted over the first routing path may comprise the information related to the packet duplication.

According to various embodiments, the information related to the packet duplication may be included in a header of a PDU that is transmitted over a duplication routing path. The duplication routing path may comprise at least one of a predetermined routing path or a routing path configured to the wireless device.

According to various embodiments, the duplication routing path may comprise at least one of the first routing path or the second routing path.

According to various embodiments, the first routing path and the second routing path may be related to different egress backhaul (BH) radio link control (RLC) channels for a same ingress BH RLC channel. A mapping between each of the first routing path and the second routing path and each of the different egress BH RLC channels may be configured to the wireless device.

According to various embodiments, the condition may be evaluated based on that packets are received on an ingress backhaul (BH) radio link control (RLC) channel for which the condition is configured.

According to various embodiments, an egress backhaul (BH) radio link control (RLC) channel of the second routing path may be mapped to an ingress BH RLC channel for which the condition is configured.

Hereinafter, details of transmitting duplicated packets on multiple routing paths are described.

The multiple routing paths may comprise a primary routing path and a secondary routing path. The primary routing path may be related to a primary routing ID, and the secondary routing path may be related to a secondary routing ID.

The secondary routing ID may comprise/consist of BAP address (e.g., destination ID) for the destination node and BAP path ID for a secondary routing path towards the destination node. The secondary routing ID may be related to the secondary routing path.

The secondary routing ID may be associated to a primary routing ID. A conventional routing ID in the BAP may be considered as a primary routing ID. That is, the primary routing ID may be a main routing ID, and the secondary routing ID may be an auxiliary routing ID for the main routing ID. The primary routing ID may comprise/consist of BAP address (e.g., destination ID) for the destination node and BAP path ID for a primary routing path towards the destination node. The primary routing ID may be related to the primary routing path. The primary routing path may be used as current transmission path towards the destination node.

For the same destination node, an IAB node may be configured with a primary and secondary routing paths. Or, for the same destination node, an IAB node may be configured with a primary and secondary next hops for packet duplication. Then, an IAB node may be configured with the primary routing ID as well as optionally the secondary routing ID for the common/same destination ID.

All the IAB nodes on the secondary routing path for the same destination node may be configured with the secondary routing ID including the same destination ID and/or the same secondary path ID/routing ID.

An IAB node may be configured with BAP duplication and/or packet duplication configuration. The BAP duplication may refer to the packet duplication operations performed at the BAP sublayer of IAB nodes. More specifically, for each ingress BH RLC channel, the IAB node may be configured with whether BAP duplication is allowed or not for the packets received on the ingress BH RLC channel. One or more egress BH RLC channels of the secondary routing path may be configured for each ingress BH RLC channel for which BAP duplication is configured/enabled. The existence of multiple egress BH RLC channels for the same ingress BH RLC channel may be interpreted by the IAB node that BAP duplication and/or packet duplication is allowed for the packets received on the ingress BH RLC channel. In such a case, whether the egress BH RLC channel is associated with the primary routing path/ID or whether the egress BH RLC channel is associated with the secondary routing path/ID may be configured.

One or more egress BH RLC channels of the secondary routing path may be configured for a group of ingress BH RLC channels for which BAP duplication is configured/enabled. A group of egress BH RLC channels may be configured for each ingress BH RLC channel, where the selection of egress BH RLC channel is required.

A list of one or more conditions for BAP duplication may be defined to detect backhaul link problem and/or to trigger BAP duplication for the incoming packets over a primary routing path and a secondary routing path. Network (or IAB donor node or topology coordinating node) may configure the one or more conditions for the IAB node to apply. Followings are examples of the one or more conditions for BAP duplication. For each condition, entry condition and leaving condition may be defined.

1) Condition 1
   Entry condition: PHY problem is detected (e.g., T310 is running and/or N310 consecutive "out-of-sync" indications are received, e.g., over K duration); and
   Leaving condition: PHY problem is resolved (T310 is stopped and/or N311 consecutive "in-sync" indications are received, e.g., over K duration).
2) Condition 2
   Entry condition: early random access (RA) problem is detected (e.g., the number of RA retransmissions exceeds threshold); and
   Leaving condition: early RA problem is resolved (e.g., RA is successful).
2) Condition 3
   Entry condition: early RLC transmission (TX) problem is detected (the number of RLC retransmissions exceeds threshold); and
   Leaving condition: early RLC TX problem is resolved (RLC transmission/retransmission is successful).
4) Condition 4
   Entry condition: radio measurement quality of the primary routing path is worse than radio measurement quality of the secondary routing path; and
   Leaving condition: radio measurement quality of the primary routing path is better than radio measurement quality of the secondary routing path (hysteresis can be applied).
5) Condition 5
   Entry condition: reception of flow control information from the next hop node on the primary routing path, where the flow control information indicates that the next hop node experiences congestion; and
   Leaving condition: reception of flow control information from the next hop node on the primary routing path, where the flow control information indicates that the next hop no longer experiences congestion.
6) Condition 6
   Entry condition: detection of buffer load exceeding a certain level for transmission on the primary routing path: and
   Leaving condition: detection of buffer load going below a certain level for transmission on the primary routing path.
7) Condition 7
   Entry condition: reception of BH link problem occurrence indication from the next hop node on the primary routing path: and Leaving condition: reception of BH link recovery indication from the next hop node on the primary routing path.

8) Condition 8

Entry condition: detection of BH link problem occurrence on the primary routing path; and Leaving condition: detection of recovery from BH link problem on the primary routing path.

9) Condition 9

Entry condition: detection of transmission delay exceeding a certain level for transmission on the primary routing path; and Leaving condition: detection of transmission delay going below a certain level for transmission on the primary routing path.

Network may indicate to an IAB node which condition among the one or more conditions presented above should be allowed/configured for the IAB node for a condition-based dynamic BAP duplication.

More than one secondary routing ID can be configured to the IAB node for the same destination node. In this case, network may configure which condition is associated with which secondary routing ID.

If an IAB node detects an entry condition for a packet or packet flow for which secondary routing ID (or secondary routing path) for BAP duplication is configured and/or if the IAB node decides to perform BAP duplication for the incoming packet, the IAB node may construct one or more duplicated packets and transmit the packets to both primary and secondary routing paths towards the destination node associated with the destination ID. The secondary routing ID may comprise/consist of the same BAP address (e.g., destination ID) for a destination node as that in the primary routing ID, and BAP path ID for the secondary routing path towards the destination node.

For the duplicated packet, the IAB node may set a special flag and/or add a special flag to the BAP header of the packet to indicate that the packet is duplicated. For example, the special flag and/or duplication flag may be set as illustrated in FIGS. 14 to 15.

Figure 14:
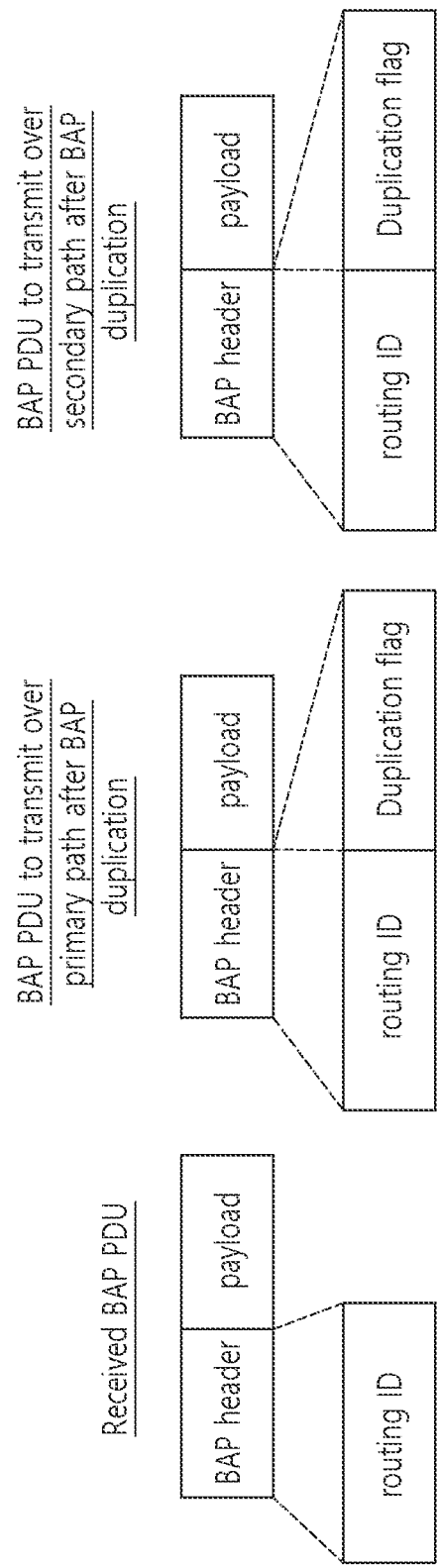
FIG. 14 shows an example of a special flag and/or duplication flag setting according to an embodiment of the present disclosure.
Figure 15:
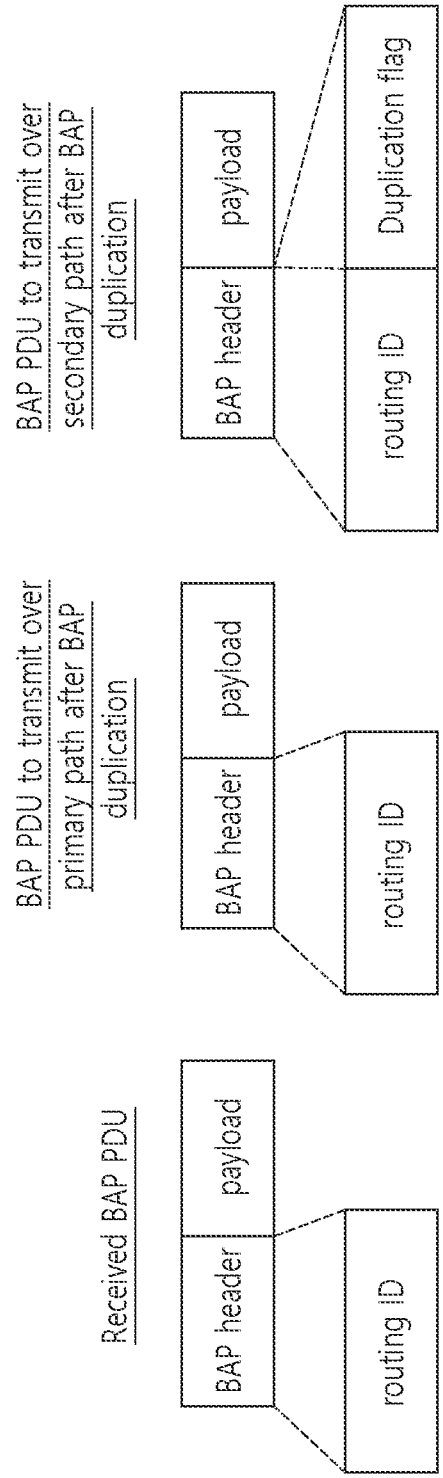
FIG. 15 shows another example of setting a special flag and/or duplication flag according to an embodiment of the present disclosure.

FIG. 14 shows an example of a special flag and/or duplication flag setting according to an embodiment of the present disclosure.

For the packet being duplicated to primary and secondary routing path, an IAB node may set a special flag and/or duplication flag in a BAP PDU to indicate that the BAP PDU/packet is duplicated and sent over each path. That is, an IAB node may indicate the special flag and/or duplication flag in the BAP header of the packet that is transmitted over the primary routing path and in the BAP header of the packet that is transmitted over the secondary routing path.

Referring to FIG. 14, a BAP PDU received by an IAB node may comprise a payload and a BAP header including a routing ID (i.e., primary routing ID). The IAB node may perform a BAP duplication for the received BAP PDU. A BAP PDU transmitted over a primary routing path after the BAP duplication may comprise a payload and a BAP header including a routing ID (i.e., primary routing ID) and a duplication flag. A BAP PDU transmitted over a secondary routing path after the BAP duplication may comprise a payload and a BAP header including a routing ID (i.e., secondary routing ID) and a duplication flag.

FIG. 15 shows another example of setting a special flag and/or duplication flag according to an embodiment of the present disclosure.

An IAB node may set a special flag and/or duplication flag in a BAP PDU to indicate that the BAP PDU/packet is duplicated to be sent over a particular path (or, duplication routing path), the particular path may be configured as either a primary routing path or a secondary routing path. That is, an IAB node may indicate a special flag and/or duplication flag in the BAP header of the packet that is transmitted over a particular path (either a primary routing path or a specific secondary routing path), and such particular path may be predefined and/or configured to the IAB node.

Referring to FIG. 15, a BAP PDU received by an IAB node may comprise a payload and a BAP header including a routing ID (i.e., primary routing ID). The IAB node may perform a BAP duplication for the received BAP PDU. A BAP PDU transmitted over a primary routing path after the BAP duplication may comprise a payload and a BAP header including a routing ID (i.e., primary routing ID). A BAP PDU transmitted over a secondary routing path after the BAP duplication may comprise a payload and a BAP header including a routing ID (i.e., secondary routing ID) and a duplication flag. In FIG. 15, it is assumed that a secondary routing path is configured to the IAB node as the particular path—however, a primary routing path may be configured to the IAB node as the particular path instead.

If an IAB node does not detect an entry condition for a packet and/or packet flow for which secondary routing ID (or secondary routing path) for BAP duplication is configured and/or if the IAB node detect a leaving condition for a packet or a packet flow for which secondary routing ID for the BAP duplication is configured after the entry condition has been met, the IAB node may transmit the packet according to the primary routing ID, i.e., without BAP duplication.

If an IAB node receives a BAP PDU/packet with a BAP header including a duplication flag, the IAB node may consider that BAP duplication is not allowed for the BAP PDU/packet. In this manner, the occurrence of BAP duplication for a packet can be restricted to at most once.

Figure 16:
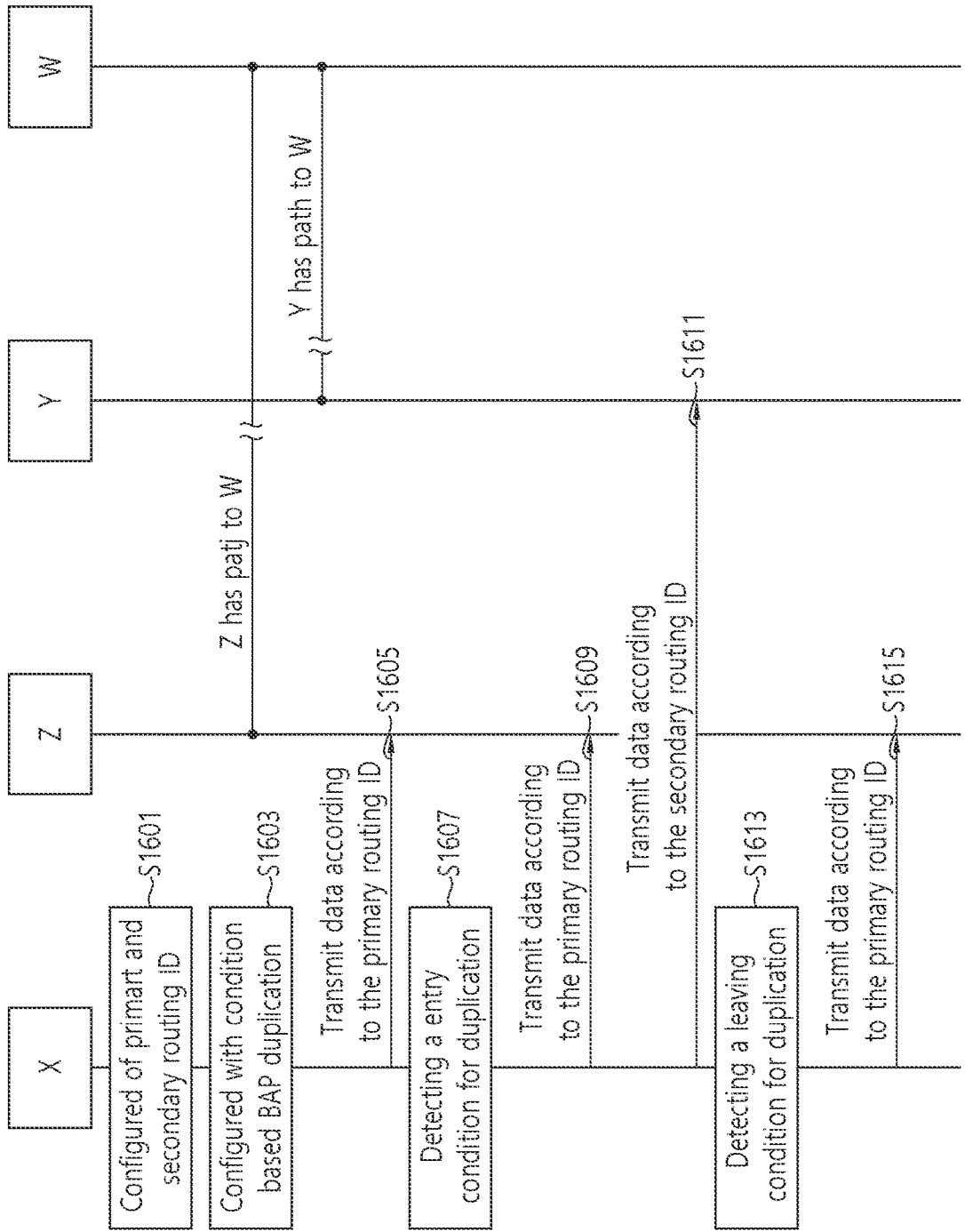
FIG. 16 shows an example of a signal flow for a BAP duplication of packets according to an embodiment of the present disclosure.

FIG. 16 shows an example of a signal flow for a BAP duplication of packets according to an embodiment of the present disclosure. In FIG. 16, an IAB node W is a destination node. The primary routing path goes through IAB node Z. The secondary routing path goes through IAB node Y. The primary routing path is mapped to a primary routing ID. The secondary routing path is mapped to a secondary routing ID.

Referring to FIG. 16, in step S1601, an IAB node X may be configured with a primary routing path and a secondary routing path towards IAB node W. That is, the IAB node X may receive a configuration for a primary routing ID and a secondary routing ID.

In step S1603, the IAB node X may be configured with one or more conditions for conditional BAP duplication.

In step S1605, the IAB node X may transmit data using the primary routing ID. In other words, the data may be transmitted over the primary routing path towards IAB node W via IAB node Z.

In step S1607, the IAB node X may detect an entry condition for conditional BAP duplication.

In step S1609, the IAB node X may transmit data using both the primary routing ID and the secondary routing ID. In other words, the data may be transmitted over both the primary routing path towards IAB node W via IAB node Z and the secondary routing path towards IAB node W via IAB node Y.

In step S1611, the IAB node X may detect a leaving condition for conditional BAP duplication.

In step S1613, the IAB node X may transmit data using the primary routing ID. In other words, the data may be transmitted over the primary routing path towards IAB node W via IAB node Z.

Hereinafter, an apparatus for a wireless device and/or an IAB node (e.g., first device 210 in FIG. 2) in a wireless communication system, according to various embodiments of the present disclosure, will be described.

For example, the wireless device and/or the IAB node may include at least one processor (e.g., processor 211 in FIG. 2), a transceiver (e.g., transceiver 213 in FIG. 2), and a memory (e.g., memory 212 in FIG. 2).

For example, the at least one processor may be configured to be coupled operably with the memory and the transceiver.

The at least one processor may be configured to control the transceiver to receive a configuration for a first routing ID and a second routing ID. The first routing ID may be related to a first routing path towards a destination node, and the second routing ID may be related to a second routing path towards the destination node. The at least one processor may be configured to control the transceiver to receive a first PDU. Based on that the condition to perform the packet duplication is satisfied, the at least one processor may be configured to: i) construct a second PDU so that a header of the second PDU includes information related to the packet duplication and the second PDU includes a payload of the first PDU; ii) control the transceiver to transmit, to the destination node, the first PDU via the first routing path related to the first routing ID; and iii) control the transceiver to transmit, to the destination node, the second PDU including the header via the second routing path related to the second routing ID.

According to various embodiments, the first routing ID may comprise a destination ID for the destination node and a first path ID related to the first routing path. The second routing ID comprise the destination ID for the destination node and a second path ID related to the second routing path.

According to various embodiments, the first routing ID may be a main routing ID. The second routing ID may be an auxiliary routing ID for the main routing ID.

According to various embodiments, the information related to the packet duplication may comprise a duplication flag. The duplication flag may inform that a PDU of which header comprises the duplication flag is a duplicated PDU. The duplication flag may be used so that a next hop of the wireless device having received the second PDU forwards the second PDU without discarding the second PDU.

According to various embodiments, the information related to the packet duplication may comprise the second routing ID.

According to various embodiments, the information related to the packet duplication may comprise a destination ID for the destination node.

According to various embodiments, a header of the first PDU transmitted over the first routing path may comprise the information related to the packet duplication.

According to various embodiments, the information related to the packet duplication may be included in a header of a PDU that is transmitted over a duplication routing path. The duplication routing path may comprise at least one of a predetermined routing path or a routing path configured to the wireless device.

According to various embodiments, the duplication routing path may comprise at least one of the first routing path or the second routing path.

According to various embodiments, the first routing path and the second routing path may be related to different egress backhaul (BH) radio link control (RLC) channels for a same ingress BH RLC channel. A mapping between each of the first routing path and the second routing path and each of the different egress BH RLC channels may be configured to the wireless device.

According to various embodiments, the condition may be evaluated based on that packets are received on an ingress backhaul (BH) radio link control (RLC) channel for which the condition is configured.

According to various embodiments, an egress backhaul (BH) radio link control (RLC) channel of the second routing path may be mapped to an ingress BH RLC channel for which the condition is configured.

Hereinafter, a non-transitory computer-readable medium having stored thereon a plurality of instructions for a wireless device, according to various embodiments of the present disclosure, will be described.

The plurality of instructions may be executed by a processor of the wireless device. When executed by the processor of the wireless device, the plurality of instructions may cause the wireless device to: receive a configuration for a first routing identity (ID) and a second routing ID, wherein the first routing ID is related to a first routing path towards a destination node, and the second routing ID is related to a second routing path towards the destination node, receive a first protocol data unit (PDU), based on that a condition to perform a packet duplication is satisfied, construct a second PDU so that a header of the second PDU includes information related to the packet duplication and the second PDU includes a payload of the first PDU, transmit, to the destination node, the first PDU via the first routing path related to the first routing ID, and transmit, to the destination node, the second PDU including the header via the second routing path related to the second routing ID.

Figure 17:
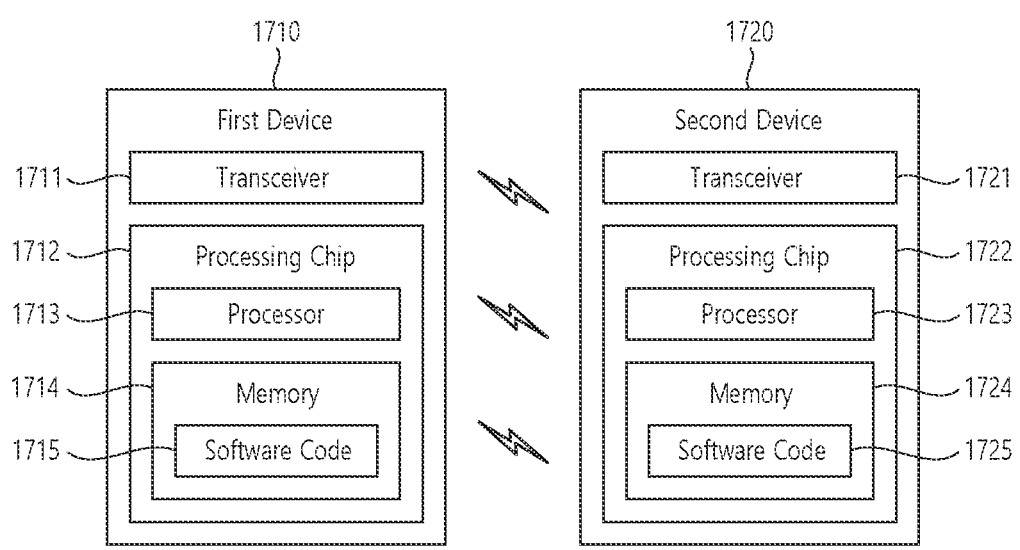
FIG. 17 shows another example of a wireless communication system to which the technical features of the present disclosure can be applied.

FIG. 17 shows another example of a wireless communication system to which the technical features of the present disclosure can be applied.

Referring to FIG. 17, the wireless communication system may include a first device 1710 (i.e., first device 210) and a second device 1720 (i.e., second device 220).

The first device 1710 may include at least one transceiver, such as a transceiver 1711, and at least one processing chip, such as a processing chip 1712. The processing chip 1712 may include at least one processor, such a processor 1713, and at least one memory, such as a memory 1714. The memory may be operably connectable to the processor 1713. The memory 1714 may store various types of information and/or instructions. The memory 1714 may store a software code 1715 which implements instructions that, when executed by the processor 1713, perform operations of the first device 910 described throughout the disclosure. For example, the software code 1715 may implement instructions that, when executed by the processor 1713, perform the functions, procedures, and/or methods of the first device 1710 described throughout the disclosure. For example, the software code 1715 may control the processor 1713 to perform one or more protocols. For example, the software code 1715 may control the processor 1713 to perform one or more layers of the radio interface protocol.

The second device 1720 may include at least one transceiver, such as a transceiver 1721, and at least one processing chip, such as a processing chip 1722. The processing chip 1722 may include at least one processor, such a processor 1723, and at least one memory, such as a memory 1724. The memory may be operably connectable to the processor 1723. The memory 1724 may store various types of information and/or instructions. The memory 1724 may store a software code 1725 which implements instructions that, when executed by the processor 1723, perform operations of the second device 1720 described throughout the disclosure. For example, the software code 1725 may implement instructions that, when executed by the processor 1723, perform the functions, procedures, and/or methods of the second device 1720 described throughout the disclosure. For example, the software code 1725 may control the processor 1723 to perform one or more protocols. For example, the software code 1725 may control the processor 1723 to perform one or more layers of the radio interface protocol.

According to various embodiments, the first device 1710 as illustrated in FIG. 17 may comprise a wireless device. The wireless device may comprise a transceiver 1711, a processing chip 1712. The processing chip 1712 may comprise a processor 1713, and a memory 1714. The memory 1714 may be operably connectable to the processor 1713. The memory 1714 may store various types of information and/or instructions. The memory 1714 may store a software code 1715 which implements instructions that, when executed by the processor 1713, perform operations comprising: receiving a configuration for a first routing identity (ID) and a second routing ID, wherein the first routing ID is related to a first routing path towards a destination node, and the second routing ID is related to a second routing path towards the destination node; receiving a first PDU; based on that a condition to perform a packet duplication is satisfied, constructing a second PDU so that a header of the second PDU includes information related to the packet duplication and the second PDU includes a payload of the first PDU; transmitting, to the destination node, the first PDU via the first routing path related to the first routing ID: and transmitting, to the destination node, the second PDU including the header via the second routing path related to the second routing ID.

The present disclosure may be applied to various future technologies, such as AI, robots, autonomous-driving/self-driving vehicles, and/or extended reality (XR).

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

Figure 18:
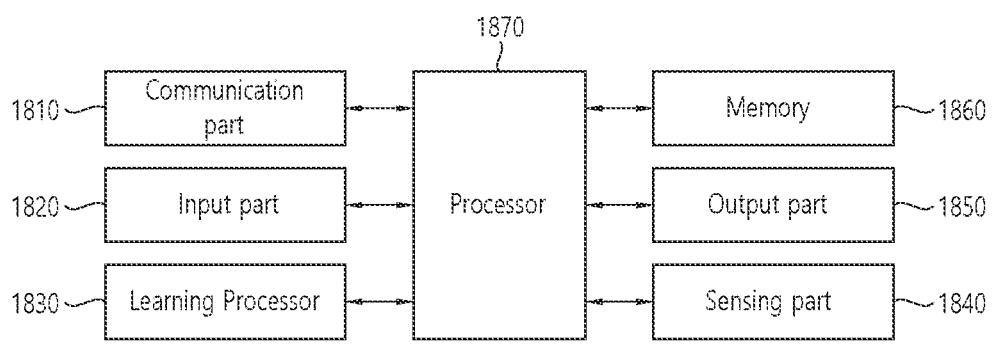
FIG. 18 shows an example of an AI device to which the technical features of the present disclosure can be applied.

FIG. 18 shows an example of an AI device to which the technical features of the present disclosure can be applied.

The AI device 1800 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 18, the AI device 1800 may include a communication part 1810, an input part 1820, a learning processor 1830, a sensing part 1840, an output part 1850, a memory 1860, and a processor 1870.

The communication part 1810 can transmit and/or receive data to and/or from external devices such as the AI devices and the AI server using wire and/or wireless communication technology. For example, the communication part 1810 can transmit and/or receive sensor information, a user input, a learning model, and a control signal with external devices. The communication technology used by the communication part 1810 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1820 can acquire various kinds of data. The input part 1820 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1820 can acquire input data to be used when acquiring an output using learning data and a learning model for model learning. The input part 1820 may obtain raw input data, in which case the processor 1870 or the learning processor 1830 may extract input features by preprocessing the input data.

The learning processor 1830 may learn a model composed of an ANN using learning data. The learned ANN can be referred to as a learning model. The learning model can be used to infer result values for new input data rather than learning data, and the inferred values can be used as a basis for determining which actions to perform. The learning processor 1830 may perform AI processing together with the learning processor of the AI server. The learning processor 1830 may include a memory integrated and/or implemented in the AI device 1800. Alternatively, the learning processor 1830 may be implemented using the memory 1860, an external memory directly coupled to the AI device 1800, and/or a memory maintained in an external device.

The sensing part 1840 may acquire at least one of internal information of the AI device 1800, environment information of the AI device 1800, and/or the user information using various sensors. The sensors included in the sensing part 1840 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1850 may generate an output related to visual, auditory, tactile, etc. The output part 1850 may include a display unit for outputting visual information, a speaker for outputting auditory information, and/or a haptic module for outputting tactile information.

The memory 1860 may store data that supports various functions of the AI device 1800. For example, the memory 1860 may store input data acquired by the input part 1820, learning data, a learning model, a learning history, etc.

The processor 1870 may determine at least one executable operation of the AI device 1800 based on information determined and/or generated using a data analysis algorithm and/or a machine learning algorithm. The processor 1870 may then control the components of the AI device 1800 to perform the determined operation. The processor 1870 may request, retrieve, receive, and/or utilize data in the learning processor 1830 and/or the memory 1860, and may control the components of the AI device 1800 to execute the predicted operation and/or the operation determined to be desirable among the at least one executable operation. The processor 1870 may generate a control signal for controlling the external device, and may transmit the generated control signal to the external device, when the external device needs to be linked to perform the determined operation. The processor 1870 may obtain the intention information for the user input and determine the user's requirements based on the obtained intention information. The processor 1870 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1830 and/or learned by the learning processor of the AI server, and/or learned by their distributed processing. The processor 1870 may collect history information including the operation contents of the AI device 1800 and/or the user's feedback on the operation, etc. The processor 1870 may store the collected history information in the memory 1860 and/or the learning processor 1830, and/or transmit to an external device such as the AI server. The collected history information can be used to update the learning model. The processor 1870 may control at least some of the components of AI device 1800 to drive an application program stored in memory 1860. Furthermore, the processor 1870 may operate two or more of the components included in the AI device 1800 in combination with each other for driving the application program.

Figure 19:
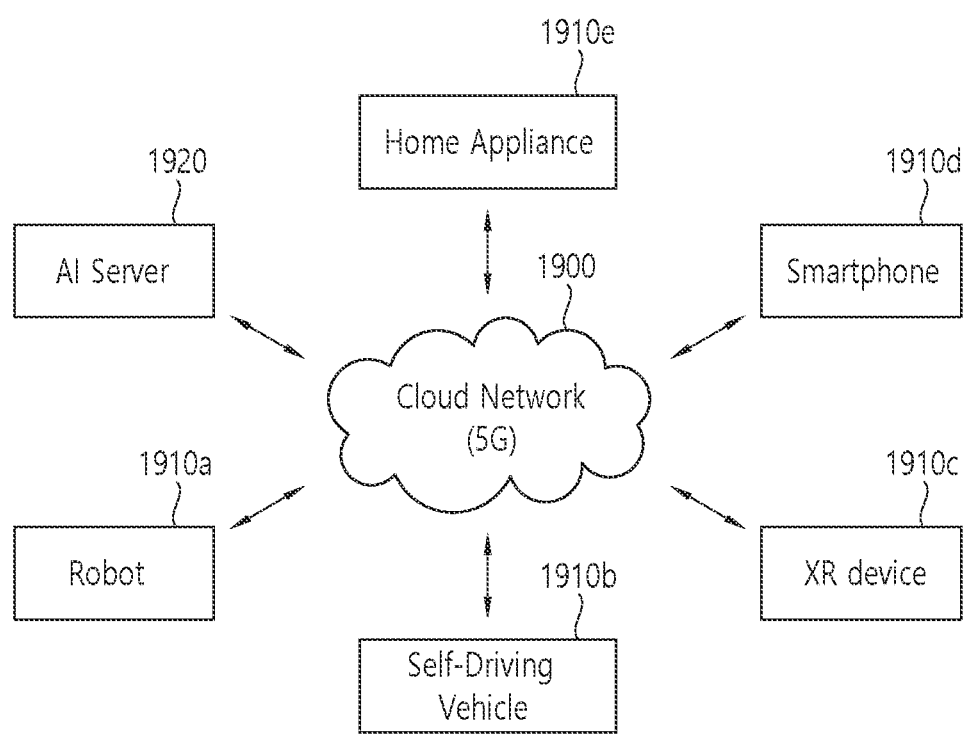
FIG. 19 shows an example of an AI system to which the technical features of the present disclosure can be applied.

FIG. 19 shows an example of an AI system to which the technical features of the present disclosure can be applied.

Referring to FIG. 19, in the AI system, at least one of an AI server 1920, a robot 1910a, an autonomous vehicle 1910b, an XR device 1910c, a smartphone 1910d and/or a home appliance 1910e is connected to a cloud network 1900. The robot 1910a, the autonomous vehicle 1910b, the XR device 1910c, the smartphone 1910d, and/or the home appliance 1910e to which the AI technology is applied may be referred to as AI devices 1910a to 1910e.

The cloud network 1900 may refer to a network that forms part of a cloud computing infrastructure and/or resides in a cloud computing infrastructure. The cloud network 1900 may be configured using a 3G network, a 4G or LTE network, and/or a 5G network. That is, each of the devices 1910a to 1910e and 1920 consisting the AI system may be connected to each other through the cloud network 1900. In particular, each of the devices 1910a to 1910e and 1920 may communicate with each other through a base station, but may directly communicate with each other without using a base station.

The AI server 1920 may include a server for performing AI processing and a server for performing operations on big data. The AI server 1920 is connected to at least one or more of AI devices constituting the AI system. i.e. the robot 1910a, the autonomous vehicle 1910b, the XR device 1910c, the smartphone 1910d and/or the home appliance 1910e through the cloud network 1900, and may assist at least some AI processing of the connected AI devices 1910a to 1910e. The AI server 1920 can learn the ANN according to the machine learning algorithm on behalf of the AI devices 1910a to 1910e, and can directly store the learning models and/or transmit them to the AI devices 1910a to 1910e. The AI server 1920 may receive the input data from the AI devices 1910a to 1910e, infer the result value with respect to the received input data using the learning model, generate a response and/or a control command based on the inferred result value, and transmit the generated data to the AI devices 1910a to 1910e. Alternatively, the AI devices 1910a to 1910e may directly infer a result value for the input data using a learning model, and generate a response and/or a control command based on the inferred result value.

Various embodiments of the AI devices 1910a to 1910e to which the technical features of the present disclosure can be applied will be described. The AI devices 1910a to 1910e shown in FIG. 19 can be seen as specific embodiments of the AI device 1800 shown in FIG. 18.

The present disclosure can have various advantageous effects.

According to the present disclosure, a packet delay in IAB networks can be reduced and a packet delivery robustness in IAB networks can be achieved.

According to the present disclosure, dynamic conditional BAP duplication in IAB networks can be achieved. For example, when some problems occur at a primary routing path towards a destination node of a packet, the IAB node can perform duplication to transmit data via both the primary routing path and the secondary routing path towards the same destination node of the packet.

According to the present disclosure, the IAB node may evaluate a condition to perform a packet duplication for a specific ingress BH RLC channel for which the condition is configured, so that the IAB node can preferentially handle packets with high priority.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a wireless device in a wireless communication system, the method comprising:
   receiving a configuration for a first routing identity (ID) and a second routing ID, wherein the first routing ID is related to a first routing path towards a destination node, and the second routing ID is related to a second routing path towards the destination node;
   receiving a first protocol data unit (PDU);
   based on a condition for a packet duplication being satisfied:
   performing the packet duplication on the first PDU to obtain a second PDU;
   transmitting the first PDU to the destination node via the first routing path related to the first routing ID; and
   transmitting the second PDU to the destination node via the second routing path related to the second routing ID; and
   based on the condition for the packet duplication being not satisfied, transmitting the first PDU to the destination node via the first routing path related to the first routing ID without performing the packet duplication,
   wherein a header of the first PDU or the second PDU comprises duplication notification notifying that the packet duplication is performed,
   wherein the method further comprises receiving a configuration configuring which header of the first PDU or the second PDU comprises the duplication notification,
   wherein the packet duplication is performed based on the packet duplication being configured to be allowed for an ingress channel on which the first PDU is received,
   wherein a first egress channel and a second egress channel are configured for the ingress channel, and
   wherein the method further comprises receiving a configuration configuring which egress channel among the first egress channel and the second egress channel is associated with the first routing ID or the second routing ID.

2. The method of claim 1, wherein the first routing ID comprises a destination ID for the destination node and a first path ID related to the first routing path, and
   wherein the second routing ID comprises the destination ID for the destination node and a second path ID related to the second routing path.

3. The method of claim 1, wherein the first routing ID is a main routing ID, and
   wherein the second routing ID is an auxiliary routing ID for the main routing ID.

4. The method of claim 1, wherein the duplication notification is used so that a next hop of the wireless device having received the second PDU forwards the second PDU without discarding the second PDU.

5. The method of claim 1, wherein a header of the second PDU comprises the second routing ID.

6. The method of claim 1, wherein a header of the first PDU transmitted over the first routing path comprises the duplication notification.

7. The method of claim 1, wherein a header of the second PDU transmitted over the second routing path comprises the duplication notification.

8. The method of claim 1, wherein the wireless device is in communication with at least one of a user equipment, a network, or autonomous vehicles other than the wireless device.

9. A wireless device configured to operate in a wireless communication system, the wireless device comprising:
   a transceiver;
   at least one processor; and
   at least one memory operatively coupled to the at least one processor and storing instructions that, based on being executed by the at least one processor, perform operations comprising:
   receiving, through the transceiver, a configuration for a first routing identity (ID) and a second routing ID, wherein the first routing ID is related to a first routing path towards a destination node, and the second routing ID is related to a second routing path towards the destination node,
   receiving, through the transceiver, a first protocol data unit (PDU),
   based on a condition for to perform a packet duplication being satisfied:
   performing the packet duplication on the first PDU to obtain a second PDU,
   transmitting, through the transceiver to the destination node, the first PDU via the first routing path related to the first routing ID, and
   transmitting, through the transceiver to the destination node, the second PDU via the second routing path related to the second routing ID, and
   based on the condition for the packet duplication being not satisfied, transmitting the first PDU to the destination node via the first routing path related to the first routing ID without performing the packet duplication,
   wherein a header of the first PDU or the second PDU comprises duplication notification notifying that the packet duplication is performed,
   wherein the operations further comprise receiving a configuration configuring which header of the first PDU or the second PDU comprises the duplication notification, wherein the packet duplication is performed based on the packet duplication being configured to be allowed for an ingress channel on which the first PDU is received, wherein a first egress channel and a second egress channel are configured for the ingress channel, and wherein the operations further comprise receiving a configuration configuring which egress channel among the first egress channel and the second egress channel is associated with the first routing ID or the second routing ID.

10. A non-transitory computer-readable medium having stored thereon a plurality of instructions, wherein the plurality of instructions, when executed by a processor of a wireless device, cause the wireless device to perform operations comprising:

receiving a configuration for a first routing identity (ID) and a second routing ID, wherein the first routing ID is related to a first routing path towards a destination node, and the second routing ID is related to a second routing path towards the destination node;

receiving a first protocol data unit (PDU);

based on a condition for a packet duplication being satisfied:

performing the packet duplication on the first PDU to obtain a second PDU;

transmitting the first PDU to the destination node via the first routing path related to the first routing ID; and transmitting the second PDU to the destination node via the second routing path related to the second routing ID; and based on the condition for the packet duplication being not satisfied, transmitting the first PDU to the destination node via the first routing path related to the first routing ID without performing the packet duplication, wherein a header of the first PDU or the second PDU comprises duplication notification notifying that the packet duplication is performed, wherein the operations further comprise receiving a configuration configuring which header of the first PDU or the second PDU comprises the duplication notification, wherein the packet duplication is performed based on the packet duplication being configured to be allowed for an ingress channel on which the first PDU is received, wherein a first egress channel and a second egress channel are configured for the ingress channel, and wherein the operations further comprise receiving a configuration configuring which egress channel among the first egress channel and the second egress channel is associated with the first routing ID or the second routing ID.

* * * * *